US012764773B2

(12) United States Patent
Han et al.

(10) Patent No.: US 12,764,773 B2
(45) Date of Patent: Oct. 13, 2026

(54) CLOUD-BASED RADIO RESOURCE MANAGEMENT

(71) Applicant: Ruckus IP Holdings LLC, Claremont, NC (US)

(72) Inventors: Yang Kiran Han, Singapore (SG); Peter G. Khoury, San Francisco, CA (US); See Ho Ting, Singapore (SG)

(73) Assignee: RUCKUS IP HOLDINGS LLC, Claremont, NC (US)

( * ) Notice: Subject to any disclaimer, the term of this patent is extended or adjusted under 35 U.S.C. 154(b) by 341 days.

(21) Appl. No.: 18/538,470

(22) Filed: Dec. 13, 2023

(65) Prior Publication Data

US 2024/0196421 A1 Jun. 13, 2024

Related U.S. Application Data

(60) Provisional application No. 63/528,670, filed on Jul. 25, 2023, provisional application No. 63/387,178, filed on Dec. 13, 2022.

(51) Int. Cl.
*H04W 72/541* (2023.01)
*H04W 72/04* (2023.01)

(52) U.S. Cl.
CPC ......... *H04W 72/541* (2023.01); *H04W 72/04* (2013.01)

(58) Field of Classification Search
CPC .... H04W 72/541; H04W 72/04; H04W 72/51
See application file for complete search history.

(56) References Cited

U.S. PATENT DOCUMENTS

2015/0341939 A1 11/2015 Sharma et al.
2017/0048715 A1* 2/2017 Fan ...................... H04W 16/10
2021/0373143 A1* 12/2021 Beaudin ................ G01S 7/2927
2023/0198641 A1* 6/2023 Peddireddy ............ H04B 17/27 455/456.1
2024/0334478 A1* 10/2024 Ali ...................... H04W 52/143

FOREIGN PATENT DOCUMENTS

WO 2015166195 A1 11/2015

OTHER PUBLICATIONS

"Extended European Search Report dated May 15, 2024, issued in corresponding European Application No. 23215908.7, pp. 8".

* cited by examiner

*Primary Examiner* — Siming Liu
(74) *Attorney, Agent, or Firm* — MH2 Technology Law Group, LLP

(57) ABSTRACT

During operation, a computer system may receive, associated with access points, information about the access points and specifying one or more communication-performance metrics associated with a shared band of frequencies. Then, for the access points, the computer system may compute co-channel interference (CCI) metrics based at least in part on the information about the access points and the one or more communication-performance metrics. Moreover, the computer system may select channels and channel widths of the access points based at least in part on the CCI metrics, a graph representation of the access points and a CCI criterion, where nodes in the graph representation correspond to the access points and edges in the graph representation correspond to communication between the pairs of access points. Next, the computer system may provide, addressed to the access points, second information specifying the channels, the channel widths and/or the transmit power of the access points.

19 Claims, 21 Drawing Sheets

CLOUD-BASED RADIO RESOURCE MANAGEMENT

CROSS REFERENCE TO RELATED APPLICATIONS

This application claims priority under 35 U.S.C. 119(c) to U.S. Provisional Application Ser. No. 63/528,670, "Cloud-Based Radio Resource Management," filed on Jul. 25, 2023, by Yang Han, and to U.S. Provisional Application Ser. No. 63/387,178, "Cloud-Based Radio Resource Management," filed on Dec. 13, 2022, by Yang Han, the contents of both of which are herein incorporated by reference.

FIELD

The described embodiments relate to techniques for selection of channels and channel widths for use by access points during communication in a shared band of frequencies.

BACKGROUND

Many electronic devices are capable of wirelessly communicating with other electronic devices. Notably, these electronic devices can include a networking subsystem that implements a network interface for: a cellular network (UMTS, LTE, 5G Core or 5GC, etc.), a wireless local area network (e.g., a wireless network such as described in the Institute of Electrical and Electronics Engineers (IEEE) 802.11 standard or Bluetooth™ from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points or APs (which are sometimes referred to as basic service sets or BSSs) that communicate wirelessly with each other and with other electronic devices using Wi-Fi, and that provide access to another network (such as the Internet) via IEEE 802.3 (which is sometimes referred to as 'Ethernet').

In existing WLAN, access points typically select channels and/or channel widths for use during communication in a shared band of frequencies (such as the 2.4, 5 and/or 6 GHz band of frequencies) independently of each other. Notably, an access point usually dynamically determines the channel in a given band of frequencies that it uses based on the current wireless conditions in the given band of frequencies in the radio-frequency (RF) environment in proximity to the access point (such as an RF environment that is within wireless range of the access point). For example, the access point may select its channel based on the result of a wireless scan of the RF environment. Moreover, often the channel width used by the access point is not dynamically determined based on the current wireless conditions in the RF environment. Instead, the access point may use a predefined or a preconfigured channel width (e.g., 40 MHz). However, these approaches for channel and/or channel width selection are inefficient and typically result in suboptimal service to clients or stations that are associated with the access points.

SUMMARY

In a first group of embodiments, a computer system that selects channels and channel widths for use during communication in a shared band of frequencies is described. This computer system includes one or more of the following features and/or performs one or more of the following operations.

Notably, the computer system includes an interface circuit that communicates with access points (e.g., via a backbone network, such as an Internet Protocol backbone network). During operation, the computer system may receive, associated with the access points, information about the access points and specifying one or more communication-performance metrics associated with the shared band of frequencies. Then, for the access points, the computer system may compute co-channel interference (CCI) metrics based at least in part on the information about the access points and the one or more communication-performance metrics, where a CCI metric in the CCI metrics for a given access point in the access points may be based at least in part on pairs of access points in the access points. Moreover, the computer system may select the channels and the channel widths of the access points based at least in part on the CCI metrics, a graph representation of the access points and a CCI criterion (such as zero CCI), where nodes in the graph representation correspond to the access points and edges in the graph representation correspond to communication between the pairs of access points. Next, the computer system may provide, addressed to the access points, second information specifying the channels and the channel widths of the access points.

Note that the CCI metric may be based at least in part on current channel overlap of a given pair of access points in the pairs of access points. For example, the current channel overlap may have a value between zero and one.

Moreover, the CCI metric may be based at least in part on signal strength metric of the given pair of access points in the pairs of access points. For example, the signal strength metric may correspond to an average signal-to-noise ratio (SNR) of the given pair of access points over a time interval. In some embodiments, the signal strength metric may have a maximum value for an intermediate range of the average SNR, which is between a low range of the average SNR and a high range of the average SNR. The signal strength metric may correspond to a probability that the given pair of access points can share a channel without interfering with each other.

Furthermore, the CCI metric may be based at least in part on an interference type metric corresponding to whether the given access point is a peer in the access points or is a rogue access point in the access points. For example, the interference type metric may be larger when the given access point is a peer than when the given access point is a rogue access point.

Additionally, the graph representation of the access points may correspond to a network topology of the access points.

In some embodiments, the channels and the channel widths of the access points may be iteratively selected, where the iterative selection involves repeating the computing and the selecting operations multiple times until the CCI criterion is achieved. Moreover, the channels and the channel widths of the access points may be selected based at least on a ranking of the access points corresponding to numbers of edges associated with the nodes in the graph representation (which is sometimes referred to as the 'degree' of the nodes) and/or centrality of the nodes in the graph representation. For example, an access point corresponding to a node having a maximum number of edges, a number of edges exceeding a predefined value, a maximum centrality or a centrality greater than a second predefined value may have a higher ranking than remaining access points in the access points. Alternatively or additionally, a second access point corresponding to a second node that has an edge with the node may have a higher ranking than the remaining access points in the access points.

Furthermore, the channel widths may include a common channel width of the access points. Note that the computer system may select the common channel width by reducing the common channel width until the CCI criterion is achieved. For example, the CCI criterion may be achieved when the CCI metrics of the access points are less than or equal to the CCI criterion.

In some embodiments, when the CCI criterion is achieved, the computer system may select revised channels widths for a subset of the access points based at least in part on the CCI metrics, the graph representation of the access points and the CCI criterion, where the revised channel widths are different from the common channel width. For example, the revised channel widths may be larger than the common channel width.

Note that the information about the access points and specifying one or more communication-performance metrics received from the given access point may include: one or more detected access points, the SNRs of the one or more detected access points, whether the one or more detected access points are peer or rouge access points, airtime utilization, whether the given access point is a mesh access point or a root access point in the mesh network, and/or occurrence of a dynamic frequency selection (DFS) signal.

Moreover, the selecting may be performed using a pretrained model, such as a neural network.

Furthermore, the selecting may be based at least in part on historical communication performance data, historical DFS data and/or priorities of the access points. For example, an access point having an historically higher airtime utilization and/or loading than other access points in the access points may have a larger revised channel width than the other access points. Alternatively or additionally, an access point having a higher priority than the other access points in the access points may have a larger revised channel width than the other access points. In some embodiments, the priority of the access point may be manually specified and/or may be based at least in part on: a timestamp (such as a time of day or a day of the week), a schedule and/or an event (such as a change to the network topology, availability or operation of one or more of the access points, occurrence of a DFS signal, etc.). For example, the priorities of one or more of the access points may be automatically determined based at least in part on factors such as: historical airtime utilization, a client count, a number of connection failures, a session number, a session durations, etc. Note that when a probability of a DFS signal occurring for a channel in the channels is greater than a predefined value, the selecting may avoid using the channel.

Additionally, a single node in the graph representation may correspond to mesh access points in a mesh network.

In some embodiments, one or more of the access points may be outside of RF communication range of at least some of a remainder of the access points.

Note that the computer system may include a controller of the access points, which manages and/or configures operation of the access points. Alternatively, or additionally, the computer system may include a cloud-based computer system. This cloud-based computer system may communicate with the access points using wired communication.

Moreover, in some embodiments, after selecting the channels and/or the channel widths of the access points, the computer system may adjust transmit power of one or more of the access points in order to reduce cross-talk or interference among the access points. For example, when cross-talk or interference among the access points cannot be eliminated by selecting the channels and/or the channel widths, the computer system may reduce the transmit power of one or more of the access points in order to reduce or eliminate the cross-talk or interference.

In a second group of embodiments, a computer system that selects channels and channel widths for use during communication in a shared band of frequencies is described. This computer system includes an interface circuit that communicates with access points (e.g., via a backbone network, such as an Internet Protocol backbone network). During operation, the computer system receives, associated with the access points, information about the access points and specifying one or more communication-performance metrics associated with the shared band of frequencies. Then, the computer system may select the channels and the channel widths of the access points based at least in part on CCI metrics for the access points and a CCI criterion (such as zero CCI), where the CCI metrics are based at least in part on the information about the access points and the one or more communication-performance metrics, and where a CCI metric in the CCI metrics for a given access point in the access points may be based at least in part on pairs of access points in the access points. Next, the computer system may provide, addressed to the access points, second information specifying the channels and the channel widths of the access points.

Note that the selecting may be based at least in part on a network topology of the access points.

Moreover, in some embodiments, after selecting the channels and/or the channel widths of the access points, the computer system may adjust transmit power of one or more of the access points in order to reduce cross-talk or interference among the access points.

In a third group of embodiments, a computer system that selects channels and channel widths for use during communication in a shared band of frequencies is described. This computer system includes an interface circuit that communicates with access points (e.g., via a backbone network, such as an Internet Protocol backbone network). During operation, the computer system receives, associated with the access points, information about the access points and specifying one or more communication-performance metrics associated with the shared band of frequencies. Then, the computer system may select the channels and the channel widths of the access points based at least in part on the information about the access points and the one or more communication-performance metrics, a graph representation of the access points and a CCI criterion (such as zero CCI), where the nodes in the graph representation correspond to the access points and edges in the graph representation correspond to communication between pairs of access points, and the selecting is based at least on a ranking of the access points corresponding to numbers of edges associated with the nodes in the graph representation and/or centrality of the nodes in the graph representation. Next, the computer system may provide, addressed to the access points, second information specifying the channels and the channel widths of the access points.

Note that the graph representation of the access points may correspond to a network topology of the access points.

Moreover, in some embodiments, after selecting the channels and/or the channel widths of the access points, the computer system may adjust transmit power of one or more of the access points in order to reduce cross-talk or interference among the access points.

In a fourth group of embodiments, a computer system that selects channels and channel widths for use during communication in a shared band of frequencies is described. This computer system includes an interface circuit that communicates with access points (e.g., via a backbone network, such as an Internet Protocol backbone network). During operation, the computer system receives, associated with the access points, information about the access points and specifying one or more communication-performance metrics associated with the shared band of frequencies. Then, the computer system may select the channels and the channel widths of the access points based at least in part on the information about the access points and the one or more communication-performance metrics, and a CCI criterion (such as zero CCI), where the selected channel widths of at least a subset of the access points is different from a selected common channel width of a remainder of the access points. Next, the computer system may provide, addressed to the access points, second information specifying the channels and the channel widths of the access points.

Note that the selecting may be based at least in part on a network topology of the access points.

Moreover, in some embodiments, after selecting the channels and/or the channel widths of the access points, the computer system may adjust transmit power of one or more of the access points in order to reduce cross-talk or interference among the access points.

In a fifth group of embodiments, a computer system that selects channels and channel widths for use during communication in a shared band of frequencies is described. This computer system includes an interface circuit that communicates with access points (e.g., via a backbone network, such as an Internet Protocol backbone network). During operation, the computer system receives, associated with the access points, information about the access points and specifying one or more communication-performance metrics associated with the shared band of frequencies. Then, the computer system may select the channels and the channel widths of the access points based at least in part on the information about the access points and the one or more communication-performance metrics, priorities of the access points, and a CCI criterion (such as zero CCI). Next, the computer system may provide, addressed to the access points, second information specifying the channels and the channel widths of the access points.

Note that the selecting may be based at least in part on a network topology of the access points.

Moreover, in some embodiments, after selecting the channels and/or the channel widths of the access points, the computer system may adjust transmit power of one or more of the access points in order to reduce cross-talk or interference among the access points.

In a sixth group of embodiments, a computer system that selects channels and channel widths for use during communication in a shared band of frequencies is described. This computer system includes an interface circuit that communicates with access points (e.g., via a backbone network, such as an Internet Protocol backbone network). During operation, the computer system receives, associated with the access points, information about the access points and specifying one or more communication-performance metrics associated with the shared band of frequencies. Then, the computer system may select the channels and the channel widths of the access points based at least in part on the information about the access points and the one or more communication-performance metrics, occurrence of an event, and a CCI criterion (such as zero CCI). Next, the computer system may provide, addressed to the access points, second information specifying the channels and the channel widths of the access points.

Note that the selecting may be based at least in part on a network topology of the access points.

Moreover, in some embodiments, after selecting the channels and/or the channel widths of the access points, the computer system may adjust transmit power of one or more of the access points in order to reduce cross-talk or interference among the access points.

Another embodiment provides one of the access points that performs counterparts to at least some of the aforementioned operations in one or more of the preceding embodiments.

Another embodiment provides a computer-readable storage medium with program instructions for use with the access point or the computer system. When executed by the access point or the computer system, the program instructions cause the access point or the computer system to perform at least some of the aforementioned operations or counterparts to at least some of the aforementioned operations in one or more of the preceding embodiments.

Another embodiment provides a method, which may be performed by the access point or the computer system. This method includes at least some of the aforementioned operations or counterparts to at least some of the aforementioned operations in one or more of the preceding embodiments.

This Summary is provided for purposes of illustrating some exemplary embodiments to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
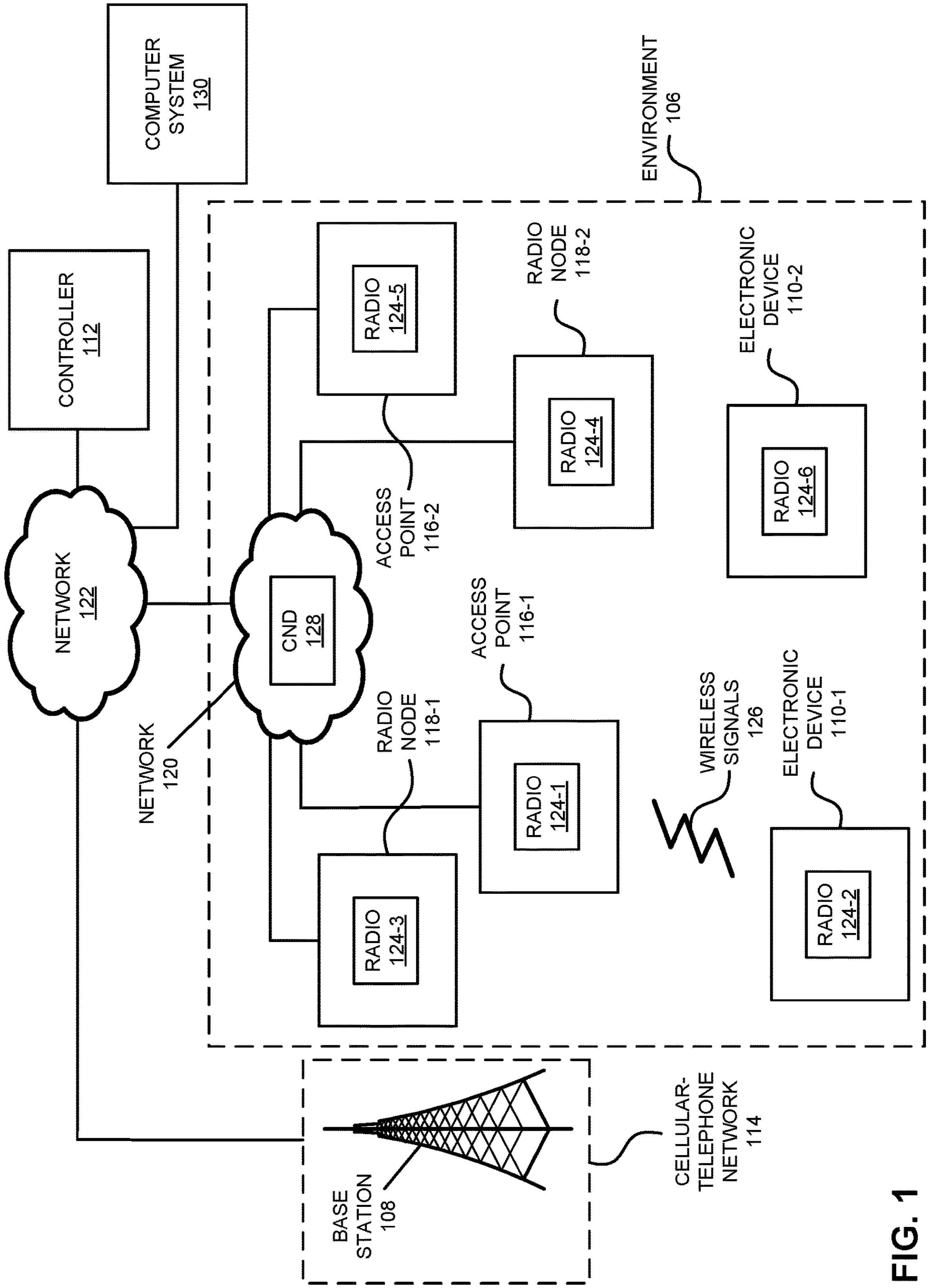
FIG. 1 is a block diagram illustrating an example of communication among electronic devices in accordance with an embodiment of the present disclosure.

A computer system may receive, associated with access points, information about the access points and specifying one or more communication-performance metrics associated with a shared band of frequencies. Then, for the access points, the computer system may compute co-channel interference (CCI) metrics based at least in part on the information about the access points and the one or more communication-performance metrics, where a CCI metric in the CCI metrics for a given access point in the access points may be based at least in part on pairs of access points in the access points. Moreover, the computer system may select channels and channel widths of the access points based at least in part on the CCI metrics, a graph representation of the access points and a CCI criterion (such as zero CCI), where nodes in the graph representation correspond to the access points and edges in the graph representation correspond to communication between the pairs of access points. Next, the computer system may provide, addressed to the access points, second information specifying the channels and the channel widths of the access points.

By selecting the channel and/or the channel width, these communication techniques may allow the computer system to improve or optimize the selected channels and channel widths while reducing or eliminating CCI. For example, by selecting the channels and the channel widths of the access points collectively, there may be improved situational awareness for one or more access points that are outside of RF communication range of some of the access points, but that can result in co-interface (so-called hidden nodes). Moreover, the communication techniques may improve RF utilization of the shared frequency bandwidth. For example, the communication techniques may allow the channels and channels widths to be independently selected for different clusters or groups of access points in a network. Furthermore, the communication techniques may allow the channels and channels widths to be dynamically adapted based at least in part on changes in the network (such as changes to a network topology), a schedule (such as based at least in part on a time of day or a day of the week), an event (such as an occurrence of a DFS signal), etc. Therefore, the communication techniques may allow the computer system to select the channels and the channel widths more efficiently and, thus, to provide improved service (such as improved communication performance) to one or more electronic devices, such as one or more clients or stations that are associated with the access points. Consequently, the communication techniques may improve the user experience when using the access points and/or the one or more electronic devices.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth or Bluetooth low energy (BLE), an IEEE 802.15.4 standard (which is sometimes referred to as Zigbee), a low-power wide-area network (LoRaWAN), a cellular-telephone network or data network communication protocol (such as a third generation or 3G communication protocol, a fourth generation or 4G communication protocol, e.g., Long Term Evolution or LTE or 5GC (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network and/or the cellular-telephone network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc.) via a macrocell in a cellular-telephone network 114 (which may include a base station 108), one or more access points 116 (which may communicate using Wi-Fi) in a WLAN and/or one or more radio nodes 118 (which may communicate using LTE) in another cellular-telephone network (such as a small-scale network or a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'computer network device.' Moreover, one or more base stations (such as base station 108), access points 116, and/or radio nodes 118 may be included in one or more wireless networks, such as: a WLAN and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or controller 112 (which may be a local or a cloud-based controller that manages and/or configures access points 116, radio nodes 118 and/or a computer network device (CND) 128, or that provides cloud-based storage and/or analytical services) using a wired communication protocol (such as Ethernet) via network 120 and/or 122. Alternatively, or additionally, access points 116 and/or radio nodes 118 may communicate with computer system 130 (which may include one or more computers at one or more locations) using the wired communication protocol. However, in some embodiments, access points 116 and/or radio nodes 118 may communicate with each other, controller 112 and/or computer system 130 using wireless communication (e.g., one of access points 116 may be a mesh access point in a mesh network). Note that networks 120 and 122 may be the same or different networks. For example, networks 120 and/or 122 may an LAN, an intra-net or the Internet. In some embodiments, network 120 may include one or more routers and/or switches (such as computer network device 128).

Figure 21:
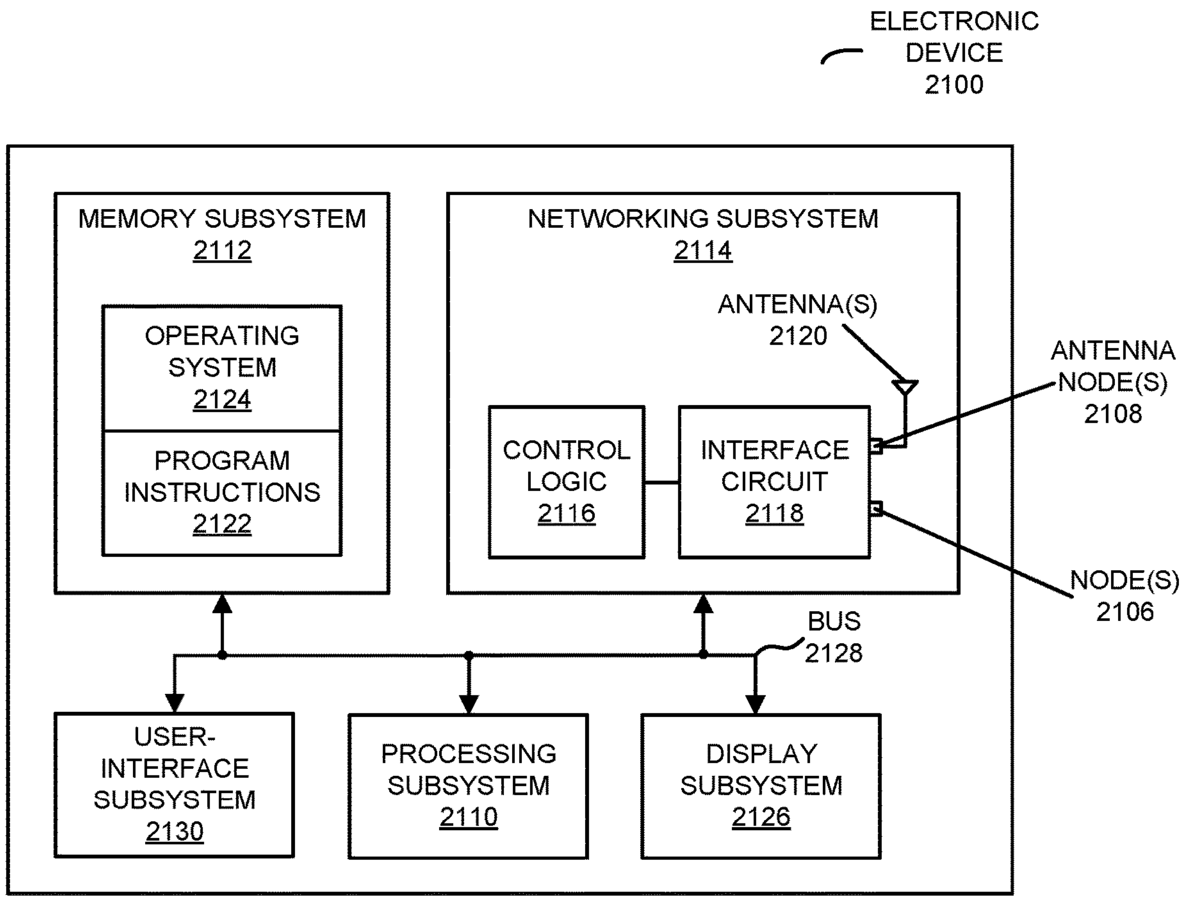
FIG. 21 is a block diagram illustrating an example of an electronic device in accordance with an embodiment of the present disclosure.

As described further below with reference to FIG. 21, electronic devices 110, controller 112, access points 116, radio nodes 118, computer network device 128, and/or computer system 130 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as, but not limited to: 900 MHZ, 2.4 GHz, 5 GHz, 6 GHZ, 7 GHz, 60 GHz, the Citizens Broadband Radio Spectrum or CBRS (e.g., a frequency band near 3.5 GHZ), and/or a band of frequencies used by LTE or another cellular-telephone communication protocol or a data communication protocol. Note that the communication between electronic devices may use multi-user transmission (such as orthogonal frequency division multiple access or OFDMA) and/or multiple input, multiple output (MIMO) communication.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, existing approaches for selecting channels and/or channel widths in a band of frequencies (such as a shared band of frequencies, e.g., one that is accessed using a contention-based channel access protocol, such as carrier sense multiple access with collision avoidance or CSMA CA) may be inefficient and may result in suboptimal communication performance.

Moreover, as discussed in FIGS. 2-20, in order to address these problems a computer system (such as controller 112 and/or computer system 130) may implement the communication techniques to select channels and channel widths of access points 116 during communication in a shared band of frequencies (such as 2.4, 5 and/or 6 GHz). In the discussion that follows, computer system 130 is used an illustration.

Notably, access points 116 may periodically perform wireless scans of their RF environments (such as every few seconds). During the wireless scans, access points 116 may detect at least some of access points 116 that are within RF communication range of each other. For example, access points 116 may detect beacons or wireless communication from at least some of access points 116. Note that one or more of access points 116 may be outside of RF communication range of at least some of a remainder of access points 116.

Then, access points 116 may provide, to computer system 130, information about access points 116 and specifying one or more communication-performance metrics associated with the shared band of frequencies. For example, the one or more communication-performance metrics may include RSSI, SNR and/or measurements of received wireless signals associated with one or more of access points 116 in different channels in the shared band of frequencies. In some embodiments, the information may include: one or more detected access points, the SNRs of the one or more detected access points, whether the one or more detected access points are peer or rouge access points, airtime utilization, whether the given access point is a mesh access point or a root access point in a mesh network, and/or occurrence of a DFS signal.

After receiving the information, computer system 130 may compute CCI metrics based at least in part on the information about access points 116 and the one or more communication-performance metrics, where a CCI metric in the CCI metrics for a given access point in access points 116 may be based at least in part on pairs of access points in access points 116. Note that the CCI metric may be based at least in part on current channel overlap of a given pair of access points in the pairs of access points. For example, the current channel overlap may have a value between zero and one. Moreover, the CCI metric may be based at least in part on signal strength metric of the given pair of access points in the pairs of access points. Notably, the signal strength metric may correspond to an average SNR of the given pair of access points over a time interval (such as 24 hrs.). In some embodiments, the signal strength metric may have a maximum value for an intermediate range of the average SNR, which is between a low range of the average SNR and a high range of the average SNR. The signal strength metric may correspond to a probability that the given pair of access points can share a channel without interfering with each other. Furthermore, the CCI metric may be based at least in part on an interference type metric corresponding to whether the given access point is a peer in access points 116 or is a rogue access point in access points 116. For example, the interference type metric may be larger when the given access point is a peer than when the given access point is a rogue access point.

Additionally, computer system 116 may select channels and channel widths of access points 116 based at least in part on the CCI metrics, a graph representation of access points 116 and a CCI criterion (such as zero CCI), where nodes in the graph representation correspond to access points 116 and edges in the graph representation correspond to communication between the pairs of access points. Note that the graph representation of access points 116 may correspond to a network topology of access points 116. In some embodiments, a single node in the graph representation may correspond to mesh access points in a mesh network.

In some embodiments, the channels and the channel widths of access points 116 may be iteratively selected, where the iterative selection involves repeating the computing and the selecting operations multiple times until the CCI criterion is achieved. Moreover, the channels and the channel widths of access points 116 may be selected based at least on a ranking of access points 116 corresponding to numbers of edges associated with the nodes in the graph representation and/or centrality of the nodes in the graph representation. Note that centrality may reflect a network position of a given node in the graph representation. In some embodiments, centrality of a given node may be calculated by counting, for all the pairs associated with the given node in the graph representation, how many times nodes can interrupt the shortest paths (geodesic distance) between the two nodes of the pairs. Alternatively or additionally, the centrality may be calculated using a betweenness technique. For example, an access point (such as access point 116-1) corresponding to a node having a maximum number of edges, a number of edges exceeding a predefined value, a maximum centrality or a centrality greater than a second predefined value may have a higher ranking than remaining access points in access points 116. Alternatively or additionally, a second access point (such as access point 116-2) corresponding to a second node that has an edge with the node may have a higher ranking than the remaining access points in access points 116. Note that in some embodiments the selecting may be performed using a pretrained model, such as a neural network.

Furthermore, the selecting may be based at least in part on historical communication performance data, historical DFS data and/or priorities of access points 116. For example, an access point having (such as access point 116-1) an historically higher airtime utilization and/or loading than other access points in access points 116 may have a larger revised channel width than the other access points. Alternatively or additionally, an access point (such as access point 116-1) having a higher priority than the other access points in access points 116 may have a larger revised channel width than the other access points. In some embodiments, the priority of the access point may be manually specified and/or may be based at least in part on: a timestamp (such as a time of day or a day of the week), a schedule and/or an event (such as a change to the network topology, availability or operation of one or more of access points 116, occurrence of a DFS signal, etc.). For example, the priorities of one or more of access points 116 may be automatically determined based at least in part on factors such as: historical airtime utilization, a client count, a number of connection failures, a session number, a session durations, etc. Note that when a probability of a DFS signal occurring for a channel in the channels is greater than a predefined value, the selecting may avoid using the channel.

Additionally, the channel widths may include a common channel width of access points 116. Note that computer system 130 may select the common channel width by reducing the common channel width until the CCI criterion is achieved. For example, the CCI criterion may be achieved when the CCI metrics of access points 116 are less than or equal to the CCI criterion. In some embodiments, when the CCI criterion is achieved, the computer system 130 may select revised channels widths for a subset of access points 116 based at least in part on the CCI metrics, the graph representation of access points 116 and the CCI criterion, where the revised channel widths are different from the common channel width. For example, the revised channel widths may be larger than the common channel width.

Next, computer system 130 may provide, addressed to access points 116, second information specifying the channels and the channel widths of access points 116.

In some embodiments, after selecting the channels and/or the channel widths of access points 116, computer system 130 may adjust transmit power of one or more of access points 116 in order to reduce cross-talk or interference among access points 116. For example, when cross-talk or interference among access points 116 cannot be eliminated by selecting the channels and/or the channel widths, computer system 130 may reduce the transmit power of one or more of access points 116 in order to reduce or eliminate the cross-talk or interference. Notably, the transmit power of one or more of access points 116 that are causing the cross-talk or interference experienced or measured at other access point(s) 116 may be reduced.

While the preceding discussion illustrated the communication techniques using a centralized approach, in other embodiments the communication techniques may be, at least in part, implemented in a decentralized manner. Notably, in some embodiments, instead of computer system 130 selecting the one or more channels and/or the one or more channel widths, access points 116 may, at least in part, select the channels and/or the channel widths for use by access points 116 during the communication in the shared license band of frequencies based at least in part on information received from computer system 130 (such as recommended channels and/or channel widths).

Moreover, while the preceding discussion illustrated the communication techniques being used to select the channels and the channel widths, in other embodiments the communication techniques being used, at a given time, to select the channels or the channel widths. Thus, in some embodiments the channels may be fixed and the channel widths may be selected, while in other embodiments the channel widths may be fixed and the channels may be selected.

In these ways, the communication techniques may provide a more robust and efficient way to select the channels and the channel widths for use by access point 116. In the process, the communication techniques may improve situational awareness, such as of one or more hidden access points (which are out of RF communication range of at least one of access points 116 and, thus, which may not be detected by at least the one of access points 116). Therefore, the communication techniques may select the channels and the one or more channel widths that have the smallest probability of overlap with the channels and channel widths of neighboring access points that are withing RF communication range of each other. This capability may allow access points 116 to provide improved service (such as improved communication performance, e.g., throughput) to one or more of electronic devices 110, such as one or more clients or stations that are associated with access points 116. Consequently, the communication techniques may improve the user experience when using access points 116 and/or the one or more electronic devices (such as electronic devices 110).

Note that, while FIG. 1 illustrates controller 112 and computer system 130 as separate components, in other embodiments these components may be combined into a single component. Thus, in some embodiments, computer system 130 may be a controller.

Figure 2:
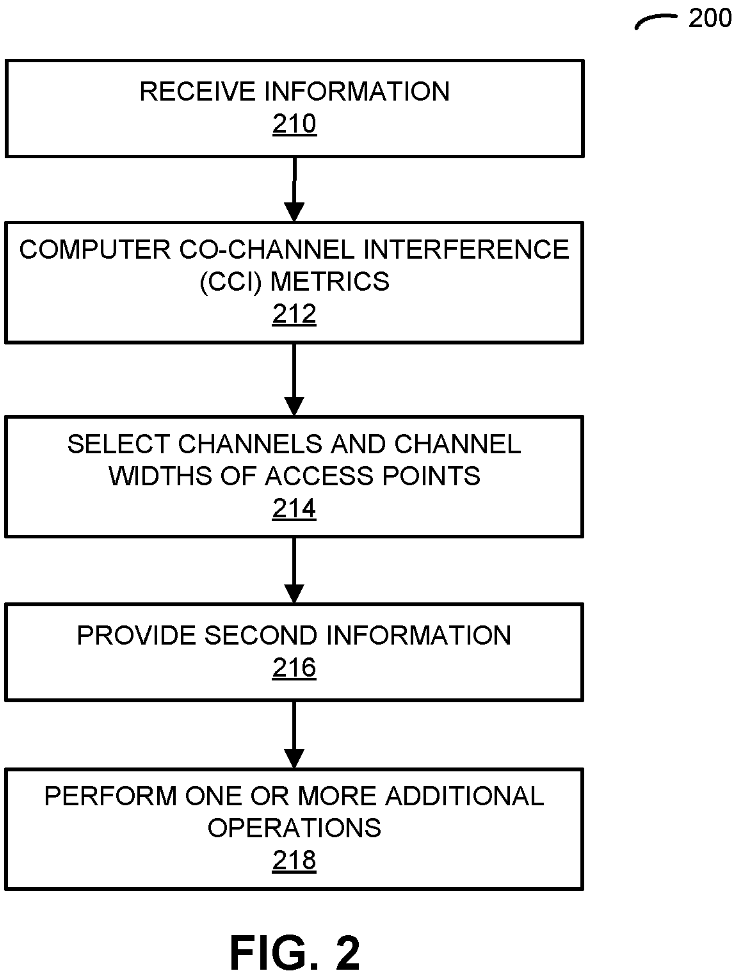
FIG. 2 is a flow diagram illustrating an example of a method for selecting channels and channel widths of access points using a computer system in FIG. 1 in accordance with an embodiment of the present disclosure.

We now describe embodiments of the method. FIG. 2 presents a flow diagram illustrating an example of a method 200 for selecting channels and channel widths, which may be performed by a computer system (such as computer system 130 in FIG. 1). During operation, the computer system may receive, associated with access points, information (operation 210) about the access points and specifying one or more communication-performance metrics associated with the shared band of frequencies. Then, for the access points, the computer system may compute CCI metrics (operation 212) based at least in part on the information about the access points and the one or more communication-performance metrics, where a CCI metric in the CCI metrics for a given access point in the access points may be based at least in part on pairs of access points in the access points. Moreover, the computer system may select the channels and the channel widths of the access points (operation 214) based at least in part on the CCI metrics, a graph representation of the access points and a CCI criterion (such as zero CCI), where nodes in the graph representation correspond to the access points and edges in the graph representation correspond to communication between the pairs of access points. Next, the computer system may provide, addressed to the access points, second information (operation 216) specifying the channels and the channel widths of the access points.

Note that the CCI metric may be based at least in part on current channel overlap of a given pair of access points in the pairs of access points. For example, the current channel overlap may have a value between zero and one.

Moreover, the CCI metric may be based at least in part on signal strength metric of the given pair of access points in the pairs of access points. For example, the signal strength metric may correspond to an SNR of the given pair of access points over a time interval. In some embodiments, the signal strength metric may have a maximum value for an intermediate range of the average SNR, which is between a low range of the average SNR and a high range of the average SNR. The signal strength metric may correspond to a probability that the given pair of access points can share a channel without interfering with each other.

Furthermore, the CCI metric may be based at least in part on an interference type metric corresponding to whether the given access point is a peer in the access points or is a rogue access point in the access points. For example, the interference type metric may be larger when the given access point is a peer than when the given access point is a rogue access point.

Additionally, the graph representation of the access points may correspond to a network topology of the access points.

Moreover, the channels and the channel widths of the access points may be selected based at least on a ranking of the access points corresponding to numbers of edges associated with the nodes in the graph representation and/or centrality of the nodes in the graph representation. For example, an access point corresponding to a node having a maximum number of edges, a number of edges exceeding a predefined value, a maximum centrality or a centrality greater than a second predefined value may have a higher ranking than remaining access points in the access points. Alternatively or additionally, a second access point corresponding to a second node that has an edge with the node may have a higher ranking than the remaining access points in the access points.

Furthermore, the information about the access points and specifying one or more communication-performance metrics received from the given access point may include: one or more detected access points, the SNRs of the one or more detected access points, whether the one or more detected access points are peer or rouge access points, airtime utilization, whether the given access point is a mesh access point or a root access point in the mesh network, and/or occurrence of a DFS signal.

Additionally, the selecting may be performed using a pretrained model, such as a neural network.

In some embodiments, the selecting may be based at least in part on historical communication performance data, historical DFS data and/or priorities of the access points. For example, an access point having an historically higher airtime utilization and/or loading than other access points in the access points may have a larger revised channel width than the other access points. Alternatively or additionally, an access point having a higher priority than the other access points in the access points may have a larger revised channel width than the other access points. Moreover, the priority of the access point may be manually specified and/or may be based at least in part on: a timestamp (such as a time of day or a day of the week), a schedule and/or an event (such as a change to the network topology, availability or operation of one or more of the access points, occurrence of a DFS signal, etc.). For example, the priorities of one or more of the access points may be automatically determined based at least in part on factors such as: historical airtime utilization, a client count, a number of connection failures, a session number, a session durations, etc. Note that when a probability of a DFS signal occurring for a channel in the channels is greater than a predefined value, the selecting may avoid using the channel.

Furthermore, a single node in the graph representation may correspond to mesh access points in a mesh network.

Additionally, one or more of the access points may be outside of RF communication range of at least some of a remainder of the access points.

Note that the computer system may include a controller of the access points, which manages and/or configures operation of the access points. Alternatively, or additionally, the computer system may include a cloud-based computer system. This cloud-based computer system may communicate with the access points using wired communication.

In some embodiments, the computer system may perform one or more optional additional operations (operation 218). For example, the channels and the channel widths of the access points may be iteratively selected, where the iterative selection involves repeating the computing (operation 212) and the selecting (operation 214) multiple times until the CCI criterion is achieved.

Moreover, the channel widths may include a common channel width of the access points. Note that the computer system may select the common channel width by reducing the common channel width until the CCI criterion is achieved. For example, the CCI criterion may be achieved when the CCI metrics of the access points are less than or equal to the CCI criterion.

Furthermore, when the CCI criterion is achieved, the computer system may select revised channels widths for a subset of the access points based at least in part on the CCI metrics, the graph representation of the access points and the CCI criterion, where the revised channel widths are different from the common channel width. For example, the revised channel widths may be larger than the common channel width.

Note that one or more operations in method 200 may be repeated periodically (such as daily) or as-needed (such as when communication performance of one or more of the access points degrades, when the network is changed, etc.). For example, one or more of the operations in method 200 may be repeated based at least in part on a request from at least one of the access points or a network operator.

Moreover, in some embodiments, after selecting the channels and/or the channel widths of the access points (operation 214), the computer system may adjust transmit power of one or more of the access points in order to reduce cross-talk or interference among the access points. For example, when cross-talk or interference among the access points cannot be eliminated by selecting the channels and/or the channel widths, the computer system may reduce the transmit power of one or more of the access points in order to reduce or eliminate the cross-talk or interference.

In some embodiments of method 200, there may be additional or fewer operations. Furthermore, the order of the operations may be changed, and/or two or more operations may be combined into a single operation.

Figure 3:
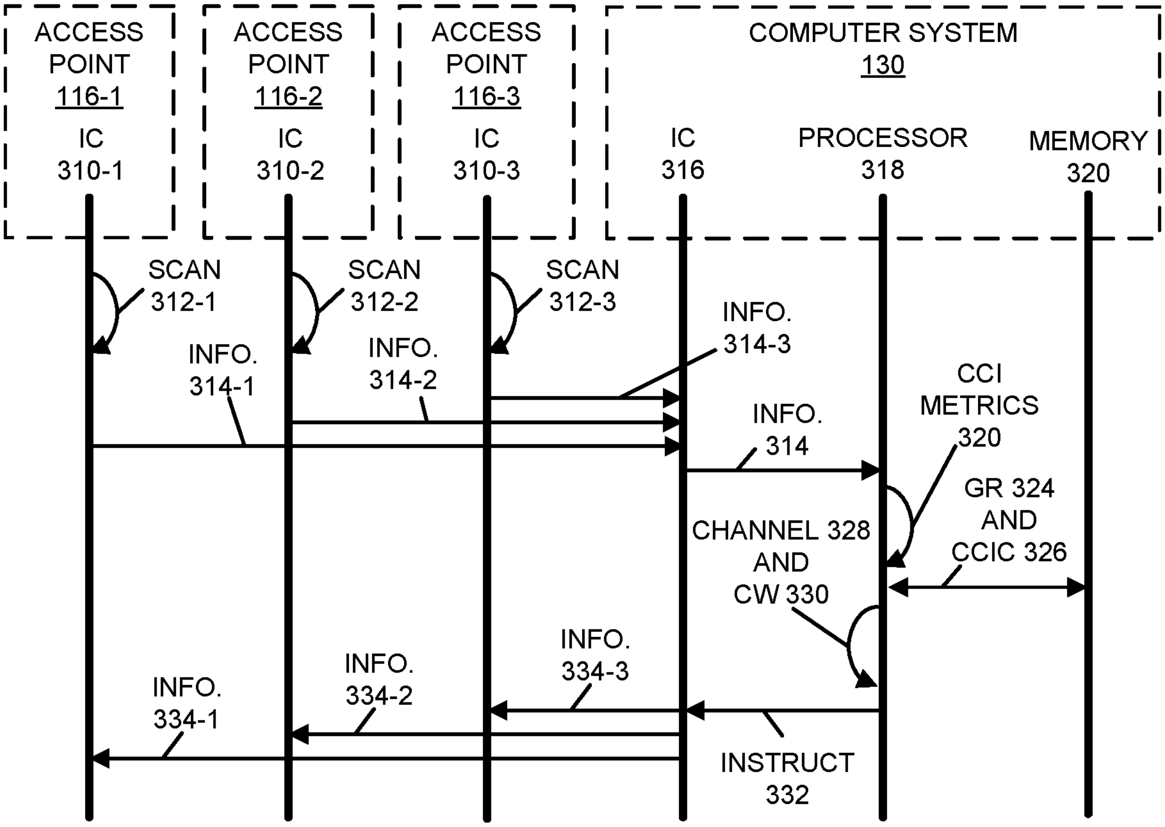
FIG. 3 is a drawing illustrating an example of communication between access points in FIG. 1 in accordance with an embodiment of the present disclosure.

Embodiments of the communication techniques are further illustrated in FIG. 3, which presents a drawing illustrating an example of communication between access points 116 and computer system 130. In FIG. 3, interface circuits 310 in access points 116 may perform wireless scans 312 of a shared band of frequencies and may measure one or more communication-performance metrics. Then, interface circuits 310 may provide information 314 about access points 116 and the one or more communication-performance metrics computer system 130.

After receiving information 314, an interface circuit 316 in computer system 130 may provide information 314 to a processor 318 in computer system 130. Then, based at least in part on information 314, processor 318 may compute CCI metrics 320 based at least in part on information 314, where a CCI metric in CCI metrics 320 for a given access point in access points 116 may be based at least in part on pairs of access points in access points 116.

Moreover, processor 318 may select channels 328 and channel widths (CWs) 330 of access points 116 during communication in the shared band of frequencies based at least in part on CCI metrics 320, a graph representation (GR) 324 of access points 116 and a CCI criterion (CCIC) 326, where the graph representation 324 and CCI criterion 326 may be accessed in memory 322 in computer system 130. Note that nodes in graph representation 324 correspond to access points 116 and edges in graph representation 324 correspond to communication between the pairs of access points.

Next, processor 318 may instruct 332 interface circuit 316 to provide, to access points 116, information 334 specifying the selected channels 328 and channel widths 330. This information may be received by interface circuits 312.

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrates operations being performed sequentially or at different times, in other embodiments at least some of these operations may, at least in part, be performed concurrently or in parallel.

We now further describe the communication techniques. An efficient cloud-based radio resource management (CRRM) system for automatically selecting the channel and channel width of the access points in a Wi-Fi network is disclosed. Powered by graph technology and graph-based techniques, the disclosed CRRM system may solve the channel planning problem by studying an access-point RF neighborhood graph of a Wi-Fi network, where various sources of data (e.g., peer access-point information, rogue access-point information, access-point airtime utilization, DFS signal events, access-point mesh hierarchy, etc.) may be jointly analyzed to derive an efficient and stable channel plan for the network.

The disclosed CRRM system may include: dynamic channel assignment (DCA), auto channel width (ACW), auto hybrid channel width (AHCW) and/or auto transmit power adjustment (ATPA). Notably, DCA may aim to provide a channel plan that minimizes CCI in a RF neighborhood with a fixed or common channel width. ACW may attempt to maximize the channel width of the access points in an RF neighborhood, while ensuring that the CCI is below a target threshold (or CCI criterion). When a CCI free channel plan can be achieved by ACW (and, more generally, that a CCI criterion is achieved), AHCW may attempt to further improve the RF utilization efficiency by adopting a higher channel width for a subset of access points in the RF neighborhood, while ensuring that zero CCI is maintained (and, more generally, that a CCI criterion is achieved). When CCI cannot be eliminated by AHCW, TPTA may attempt to further reduce or eliminated CCI by reducing the transmit power of one or more access points.

Wi-Fi has been one of the most successful and fast-growing wireless technologies in past decades. The massive growth of Wi-Fi access points and client devices has resulted in an increasing scarcity of wireless radio resources. In order to accommodate large number of access points with limited radio resources (such as channels) in a network, channel reusing is generally needed within an RF neighborhood. While it usually causes no harm to reuse a channel between two access points that are sufficiently spaced out in the RF space, airtime contention happens when two neighboring access points (such as access points that can detect each other's wireless signals) occupy the same channel, and this is commonly known as CCI. Besides the neighboring access points from the same network, an access point may also receive CCI from nearby rogue access points (such as access points from other networks) and/or non-Wi-Fi devices that occupy the same spectrum band. CCI may severely deteriorate the airtime utilization and throughput performance of an access point and should be avoided to the largest extent possible through careful channel planning.

In Wi-Fi networks, the system that manages channel planning and controls CCI is usually referred to as radio resource management (RRM) system. A RRM system may continuously collect information about the RF environments around the access points and may use this information to optimize parameters, such as: channel, channel width, transmission power, user allocation, data rate, beam beamforming, roaming strategy, etc. While other RF optimization targets exist, in the discussion that follows we focus on channel selection and channel width selection.

Traditionally, channel/channel width selection techniques are usually implemented on access points and executed in a distributed manner, e.g., each access point may make its own decision based at least in part on its local observations without considering decisions of other access points. While this approach may simplify the information collection and processing, it usually suffers from issues such as sub-optimal results and/or slow convergence, because of a lack of communication and collaboration between access points.

In this disclosed communication techniques, access points may report information about their local RF environments (such as: peer access-point information, rogue access-point information, access-point airtime utilization, DFS signal events, access-point mesh hierarchy, etc.) to a cloud-based RRM system, such as a cloud-based computer system. The computer system may be combined and jointly analyzed the data from the access points using a graph framework. Because of the centralized nature and the use of graph techniques, the disclosed communication techniques may be able to provide an efficient and stable channel plan without suffering from the issues often associated with a distributed technique. Consequently, the airtime utilization and throughput performance of the access points may be significantly improved.

The communication techniques may provide several advantages. Notably, the communication techniques may use a centralized RRM system in which multiple sources of data are jointly optimized to achieve an efficient and stable channel plan. Moreover, the communication techniques may use an effective CCI metric, a CCI ratio, to measure the CCI performance of the access points/network. Furthermore, the communication techniques may formulate the channel/channel width selection as an iterative optimization problem under a graph framework. Graph techniques, such as weakly-connected components and page rank, may be used to facilitate a fast and efficient convergence of the channel plan. Additionally, an ACW technique may be used to improve RF utilization efficiency by automatically and independently selecting improved or optimal channel widths for different RF clusters. In some embodiments, an AHCW technique may be used to further improve the RF utilization efficiency by allowing a subset of access points to have a larger channel width than a common channel width obtained using ACW, while ensuring that zero CCI or the achieving of a CCI criterion using ACW is not compromised.

In the discussion that follows, note that a graph or graph representation may be a data model that includes nodes and edges, where a node represents an entity (such as an access point) and an edge represents a relationship (such as communication) between the two nodes it connects to. Both nodes and edges may carry or have one or more properties.

Moreover, an RF neighborhood graph (RFNG) may be a graph in which a node may represent an access point and an edge pointing from a first access point ($AP_1$) to a second access point ($AP_2$) may indicate that $AP_1$ can detect transmission from $AP_2$, e.g., the transmission would cause CCI to $AP_1$ if it uses the same channel as $AP_2$. Note that the edges in a RFNG may be directional. For example, an edge from $AP_1$ to $AP_2$ may not guarantee the existence of an edge from $AP_2$ to $AP_1$. An edge from $AP_1$ to $AP_2$ may be denoted as $AP_1 \rightarrow AP_2$.

Furthermore, an RF neighborhood cluster (RFNC) may be a subgraph of a RFNG in which the nodes are weakly (e.g., regardless of the direction of the edges) connected. An RFNC may represent a group of access points that are located in physical proximity and, thus, which may need to be jointly optimized for channel and channel width selection.

Additionally, a channel overlapping weight (COW) may be a weight carried by each edge in an RFNG that describes the degree of channel overlap between an access point and one of its neighboring access points. The COW of edge e may be denoted as COW(e). It may be calculated as the ratio between the width of the overlapping spectrum (in MHz) to the channel width of this access point (in MHz). Table 1 presents examples of COW where edges $AP_1 \rightarrow AP_2$ and $AP_2 \rightarrow AP_1$ exist.

TABLE 1

| Channel of $AP_1$ | Channel of $AP_2$ | COW ($AP_1 \rightarrow AP_2$) | COW ($AP_2 \rightarrow AP_1$) |
|---|---|---|---|
| 36 (20 MHz) | 40 (20 MHz) | 0 (0/20) | 0 (0/20) |
| 36 (20 MHz) | 38 at [36, 40] (40 MHz) | 1 (20/20) | 0.5 (20/40) |
| 36 (20 MHz) | 36 (20 MHz) | 1 (20/20) | 1 (20/20) |
| 38 at [36, 40] (40 MHz) | 38 at [36, 40] (40 MHz) | 1 (40/40) | 1 (40/40) |

Note that a signal strength weight (SSW) or signal strength metric may be a weight carried by each edge in a RFNG that describes the signal strength and, thus, the impact of potential CCI of this edge. The SSW of edge e may be denoted as SSW(e). As shown in Table 2, the SSW may be a function of the SNR of an edge. For example,

TABLE 2

| | SSW |
|---|---|
| SNR ≤ 20 dB | 0.9 |
| 20 dB < SNR < 35 dB | 1.1 |
| SNR ≥ 35 dB | 1.0 |

In this example, the highest SSW occurs for an intermediate range of SNR values. This may emphasize the impact of a 'hidden node.' However, a wide variety of mappings from SNR to SSW may be used.

Interference type weight (ITW) or an interference type metric may be a weight carried by each edge in a RFNG that describes a type of interferer. The ITW of edge e may be denoted as ITW(e). In some embodiments, a larger ITW may be assigned to an edge when the interferer is a peer access point (such as an access point from the same network), and a smaller ITW may be assigned to an edge when the interferer is a rogue access point. This may encourage an access point to contend with rogue access points rather than with its peer access points when CCI is inevitable. Note that example values of ITW for a peer access point and a rogue access point may be 1 and 0.5, respectively.

Figure 4:
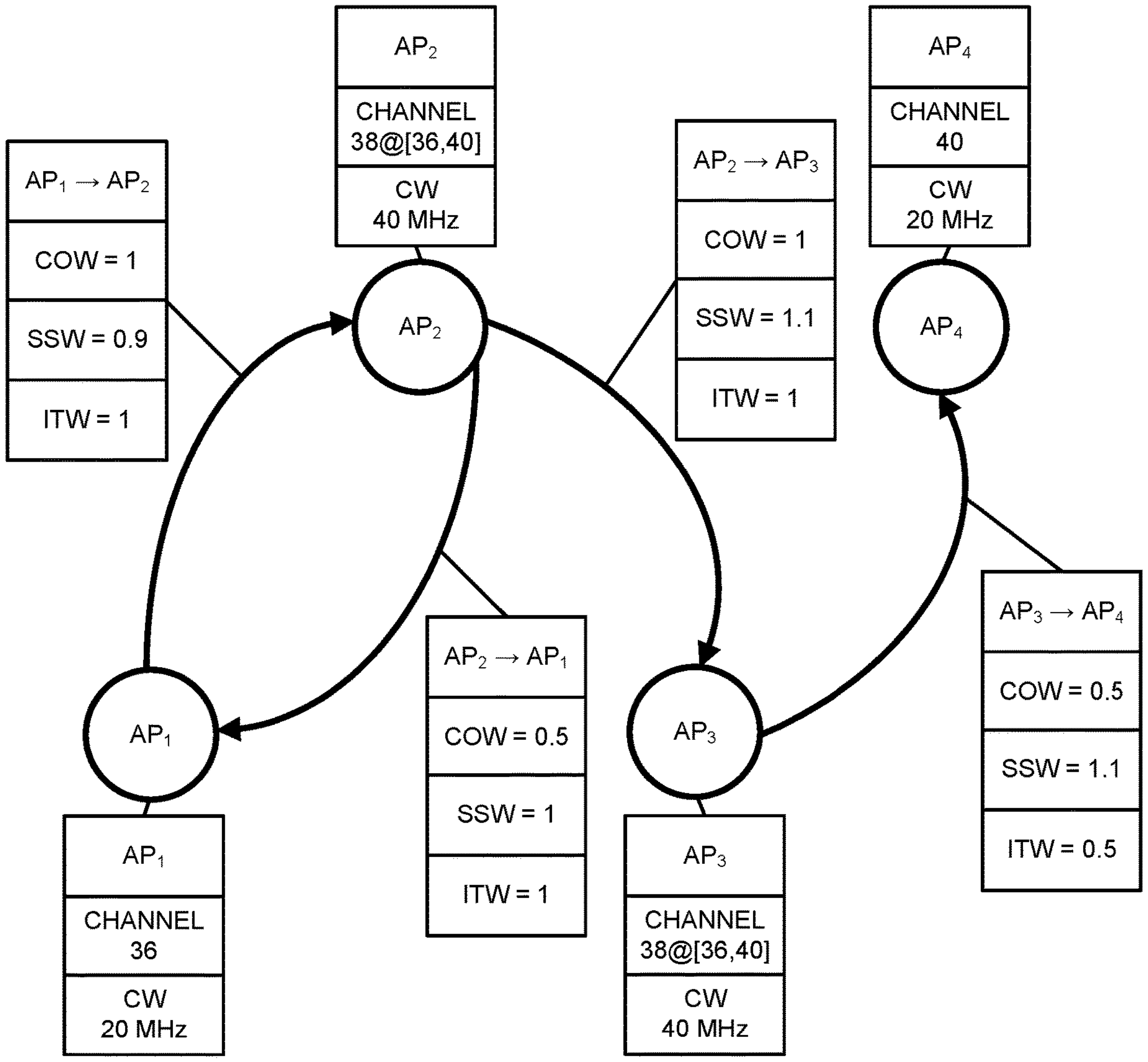
FIG. 4 is a drawing illustrating an example of information about access points and specifying one or more communication-performance metrics associated with a shared band of frequencies in accordance with an embodiment of the present disclosure.

Moreover, a CCI ratio or a CCI metric may measure the CCI performance of an access point or a group of access points (e.g., an RFNC, a zone, access points within the same building, etc.). CCIR may have a value range from 0 to 1, and a larger CCIR may indicate worse CCI performance. In some embodiments, the CCIR for a group of access points may be calculated as $$CCIR(G) = \frac{\sum_{e \in E(g)} COW(e) \cdot SSW(e) \cdot ITW(e)}{\sum_{e \in E(g)} SSW(e) \cdot ITW(e)},$$

where E(G) may denote the collection of the edges that point from access points in G to their neighboring access points. FIG. 4 presents a drawing illustrating an example of information about access points in an RFNG and specifying one or more communication-performance metrics associated with a shared band of frequencies. In the following examples, the information in FIG. 4 is used in CCIR calculations for this RFNG. Note that access points $AP_1$, $AP_2$ and $AP_3$ are peer access points, and access point $AP_4$ is a rogue access point.

The CCIR for individual access points and the whole RFNG may be calculated as $$CCIR(AP_1) = \frac{1 \cdot 0.9 \cdot 1}{0.9 \cdot 1} = 1,$$

$$CCIR(AP_2) = \frac{0.5 \cdot 1 \cdot 1 + 1 \cdot 1.1 \cdot 1}{1 \cdot 1 + 1.1 \cdot 1} = 0.762,$$

$$CCIR(AP_3) = \frac{0.5 \cdot 1.1 \cdot 0.5}{1.1 \cdot 0.5} = 0.5, \text{ and}$$

$$CCIR(AP_4) = \frac{1 \cdot 0.9 \cdot 1_{0.5} \cdot 1 \cdot 1_1 \cdot 1.1 \cdot 1 + 0.5 \cdot 1.1 \cdot 0.5}{0.9 \cdot 1 + 1 \cdot 1 + 1.1 \cdot 1 + 1.1 \cdot 0.5} = 0.782.$$

Average CCIR over a time interval may be obtained by averaging the CICIR values for different instants of time within the time interval.

Figure 5:
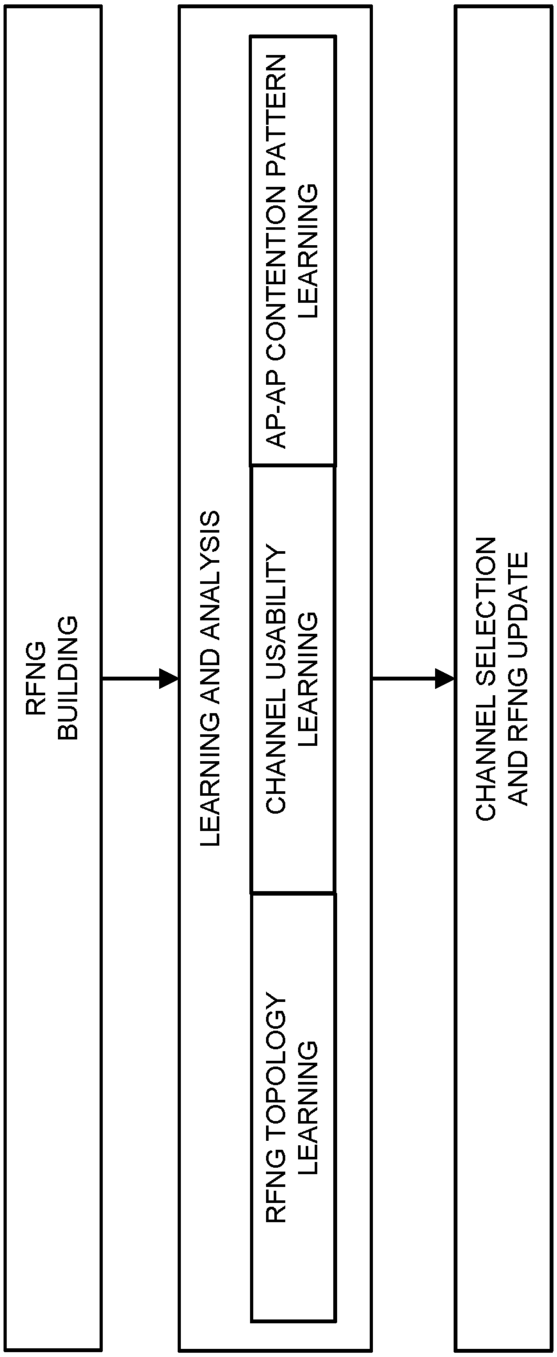
FIG. 5 is a flow diagram illustrating an example of a method for selecting channels and channel widths using a computer system in FIG. 1 in accordance with an embodiment of the present disclosure.

FIG. 5 presents a flow diagram illustrating an example of a method for selecting channels and channel widths using computer system 130 (FIG. 1). During RFNG building, a DCA processing engine may build an RFNG of a network based on peer access-point and rogue access-point data, where each access point may report all the peer/rogue access points that it detects and their corresponding SNRs. When an access point reports a peer/rogue access point with an SNR larger than a predefined threshold (e.g., 10 dB), a node for the access point, a node for the peer/rogue access point, and an edge pointing from the access point to the peer/rogue access point may be created in the RFNG. Moreover, SSW and ITW may also calculated and attached to or associated with this edge as properties.

In order to obtain a complete RFNG, peer access-point data over a time interval (as opposed to at an instant in time) may be used. In this case, nodes/edges missing at certain time instances (e.g., because of access-point rebooting) may still be captured in the RFNG. Furthermore, the average SNR over a time interval may be less sensitive to instantaneous signal fluctuations and, thus, may better represent the signal strength of an edge.

Note that the executions of RFNG building may be scheduled at fixed time interval (e.g., daily) or triggered by events that may result in a change in the RF environments. These events may include: adding or removing an access point, rebooting an access point, enabling or disabling an access-point radio, detection of a rogue access point, etc. Moreover, the RFNG building may be executed in either complete mode in which the nodes and edges are flushed and re-created or in incremental mode in which only nodes and edges subjected to changes are updated.

In some embodiments, a co-channel interference assurance (CCIA) flag may be added to or associated with selected access points. DCA may support a user-defined priority access-point list (which is sometimes referred to as a 'CCIA list'). During RFNG building, the access points in the CCIA list may have a property 'cciaFlag=True' added to or associated with its corresponding access-point node. Moreover, DCA may give an access point with 'cciaFlag=True' a higher priority in channel selection by applying an extra penalty to the neighboring access points when they select the same channel as this access point. In this way, zero CCIR (or CCI free), and more generally less than a CCI criterion (such as CCIR less than 0.01), for this access point may be guaranteed as much as possible, even when zero CCIR is not achievable for the whole RFNG.

During RFNG topology learning, appropriate treatment for a mesh network may be applied. Notably, in Wi-Fi networks, mesh access points that mesh from the same mesh root access point (directly or indirectly) may need to use the same channel, and the edges between them may not be considered as edges with CCI. Moreover, mesh access points (including the mesh root access point) may be refactored into a single node and may be represented by the mesh root access point. Furthermore, inward edges pointing to multiple mesh access points from the same peer access point may be refactored into a new edge pointing from the peer access point to the newly refactored mesh root access-point node. Note that the SSW of the new edge may equal to a summation of the SSW of the original edges, while the COW and ITW of the new edge may remain the same as those of the original edges. Additionally, outward edges pointing from multiple mesh access points to the same peer access point may be refactored into a new edge pointing from the newly refactored mesh root access-point node to the peer access point. The SSW of the new edge may equal to a summation of the SSW of the original edges, while the COW and ITW of the new edge remain the same as those of the original edges.

Figure 6:
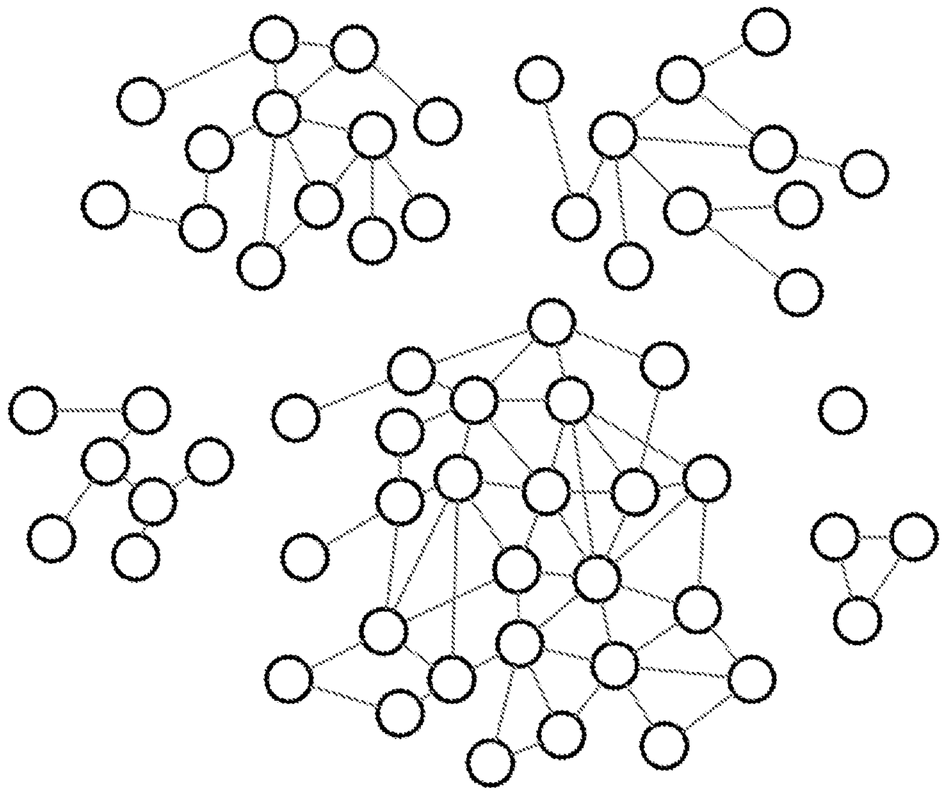
FIG. 6 is a drawing illustrating an example of a network topology of access points in accordance with an embodiment of the present disclosure.

The, RFNCs may be identified using a weakly-connected component technique. Notably, each RFNC may represent a group of access points that are located nearby or proximate to each other, but that are not close to access points from other RFNCs. FIG. 6 presents a drawing illustrating an example of a network topology of access points, where each of the six intra-connected and inter-isolated clusters of access points represents an RFNC.

Note that channel selection may be performed separately for each RFNC without considering other RFNCs. This may reduce the computation complexity of the DCA. Moreover, different channel widths may be applied in different RFNCs, which may maximizes the efficiency of RF resource utilization. This is described further below in the discussion of the AWC.

Moreover, the order of access points for channel selection may be determined using a page rank technique. Notably, graph-technique page rank may be executed for the RFNG, and each access-point node may be assigned with a page-rank score. Page rank may assign high scores to 'important' nodes that have many connections with other nodes and/or that have connections with other 'important' nodes. DCA may perform channel selection for the access points in the descending order of their page-rank scores.

In the following example, page rank helps to minimize CCI in channel selection. Notably, for three access points and with an RFNG shown in FIGS. 7 and 8, which present drawings illustrating examples of selecting channels of access points, the page-rank scores for $AP_1$, $AP_2$ and $AP_3$ may be 0.77, 1.46 and 0.77, respectively. There may be two distinct channels (e.g., channel A and channel B) to assigned to these access points.

Figure 7:
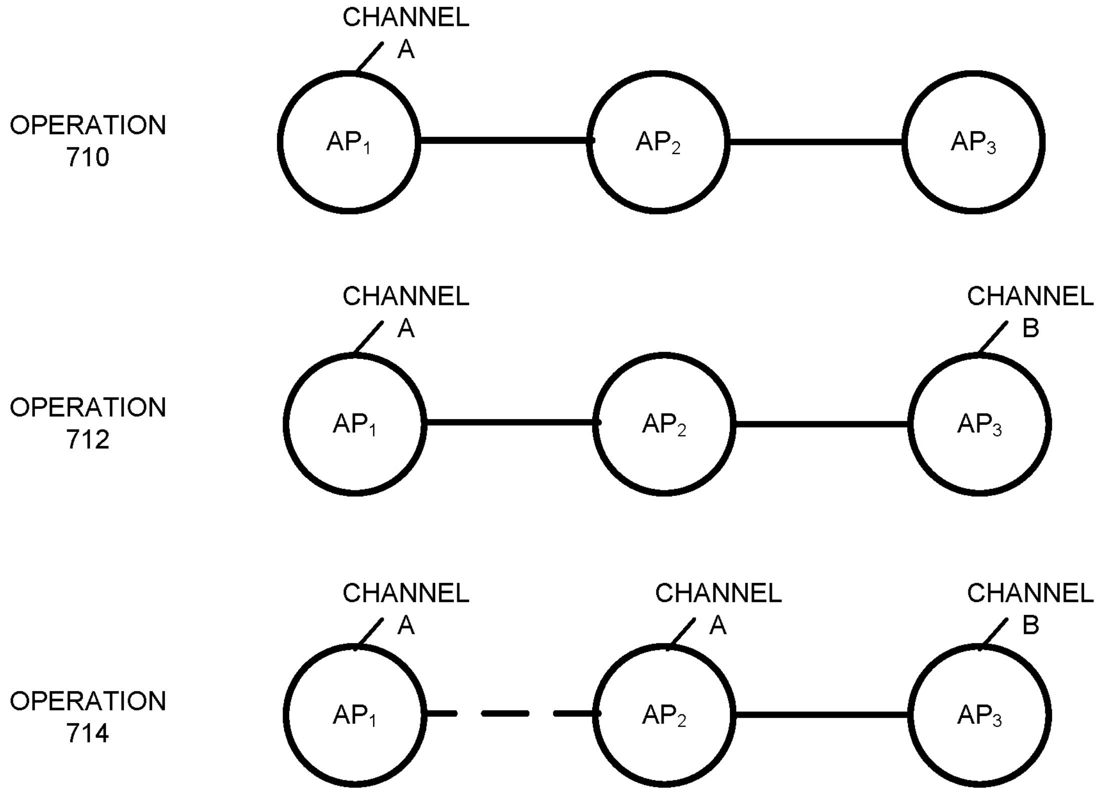
FIG. 7 is a drawing illustrating an example of selecting channels of access points in accordance with an embodiment of the present disclosure.

As shown in FIG. 7, in a first scenario, channel selection may not be performed in the descending order of page-rank scores of the access points. After completing operations 710-714, CCI will occur no matter which channel is selected (or a CCIR of zero is not achievable).

Figure 8:
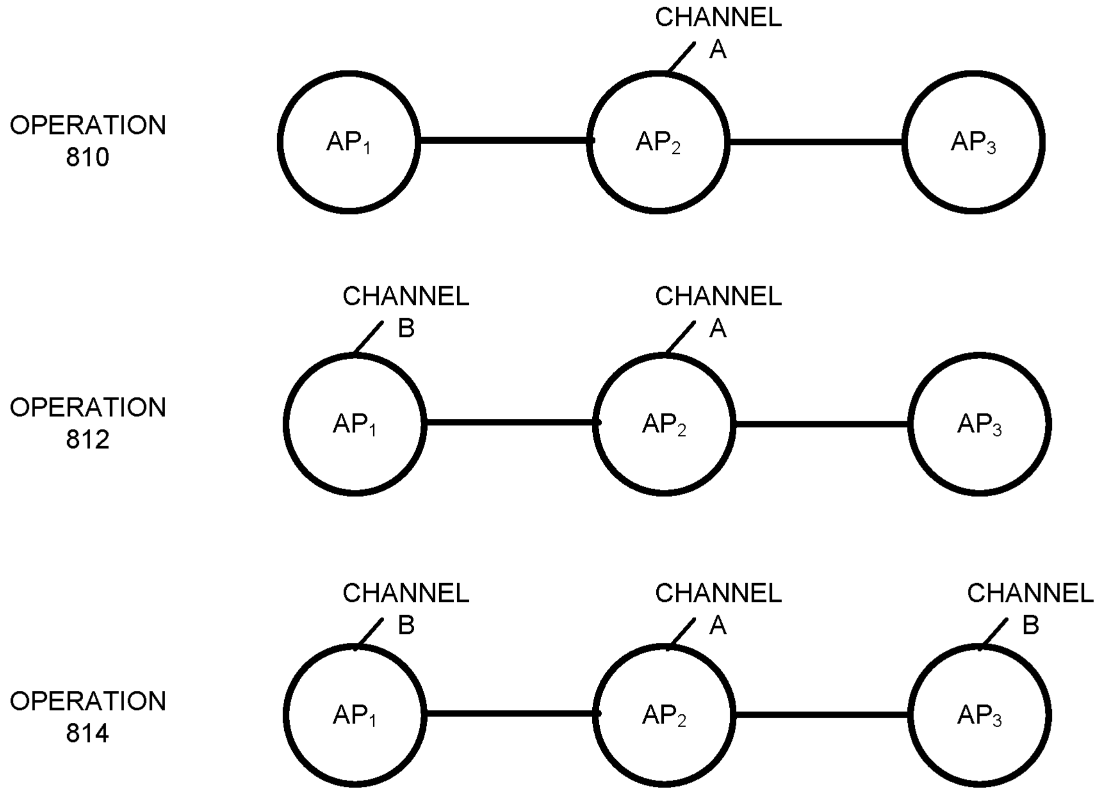
FIG. 8 is a drawing illustrating an example of selecting channels of access points in accordance with an embodiment of the present disclosure.

Alternatively, as shown in FIG. 8, in a second scenario channel selection may be performed in the descending order of the page-rank scores of the access points. After completing operations 810-814, no CCI exists (or a CCIR of zero is achieved).

In real networks, where the topology of the RFNG may be much more complicated, page rank may facilitate minimizing of the CCIR when it is physically possible.

Furthermore, during channel usability learning, the impact of DFS may be addressed. DFS is a Wi-Fi feature that enables access points to use a 5 GHz band of frequencies that is generally reserved for radars. Using DFS channels increases the number of available channels for channel selection and, thus. reduces the probability of CCI occurrences. However, if an access point detects a radar signal (or a DFS signal) during its operation on a DFS channel, it needs to vacate that DFS channel immediately and hop to another available channel. This is a disruptive process, because it would cause disconnections for the associated clients on this access point, and, thus, should be avoided as much as possible. Therefore, if we know that radar signals are likely to occur on a particular DFS channel, this DFS channel may be excluded when selecting channels for the access points.

Given these considerations, the decision as to 'whether a DFS channel should be considered as usable' depends on 'how likely radar signals will appear on that channel.' In the communication techniques, this question may be answered by analyzing historical DFS signals that were detected by the access points in a RFNC in a crowdsourcing manner. Because access points from the same RFNC are located near or proximate to each other, and the usability of a DFS channel may apply across the RFNC (e.g., when radar signals can be detected by an access point, they can probably be detected by other access points in the same RFNC).

Figure 9:
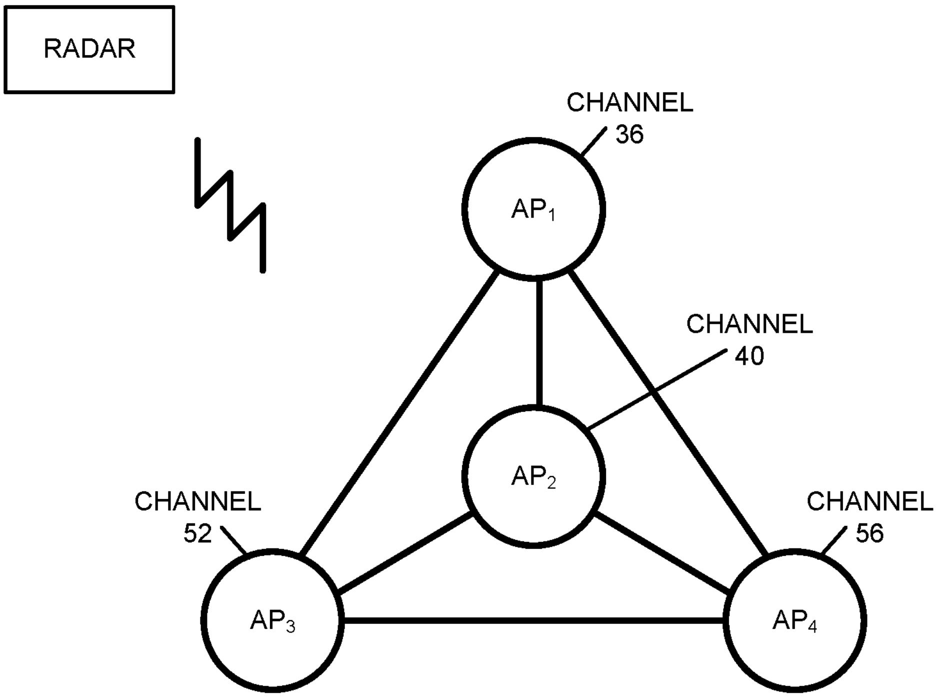
FIG. 9 is a drawing illustrating an example of an impact of dynamic frequency selection (DFS) on the selecting of channels of access points in accordance with an embodiment of the present disclosure.

DFS channel evaluation is illustrated in FIG. 9, which presents a drawing illustrating an example of an impact of DFS on the selecting of channels of access points. Notably, DFS signals may occur on channels 52 and 56. $AP_3$ may detect a DFS signal on channel 52 and $AP_4$ may detect a DFS signal on channel 54. Therefore, channels 52 and 56 may be deemed unusable for the whole RFNC, even if DFS signals are not detected on $AP_1$ and $AP_2$ (DFS signals can only be detected on-channel, and $AP_1$ and $AP_2$ may not use channel 52 or 56 at the moment). In some embodiments, when a DFS channel is deemed unusable in a RFNC, it may be added to a DFS risky channel list (DRCL) for this RFNC.

Additionally, during AP-AP contention pattern learning, channel usage patterns of different access points may be learned. Notably, access points in the same network may have different usage patterns. For example, some access points may serve large number of clients and may have high airtime utilization, while other access points may be pretty idle and may have low airtime utilization at the same time.

CCI may be especially harmful when two co-channel neighboring access points have similar usage patterns, e.g., when they tend to be busy simultaneously resulting in severe airtime contention. On the other hand, the impact of CCI may be acceptable when two co-channel neighboring access points have distinct usage patterns, because they rarely need to contend for airtime.

In the communication techniques, the DCA may analyze historical airtime utilization data of the access points and may derive an airtime contention factor (ACF) for the edges in a RFNG. Notably, the ACF of a pair of neighboring access points may be calculated as the probability that their airtime utilizations are simultaneously higher than a predefined threshold. Note that the ACF may describe the 'potential damage' when two neighboring access points are co-channel. When CCIR equal to zero is not achievable, the DCA may try to ensure that CCI only happens on edges where the ACF is small.

Figure 10:
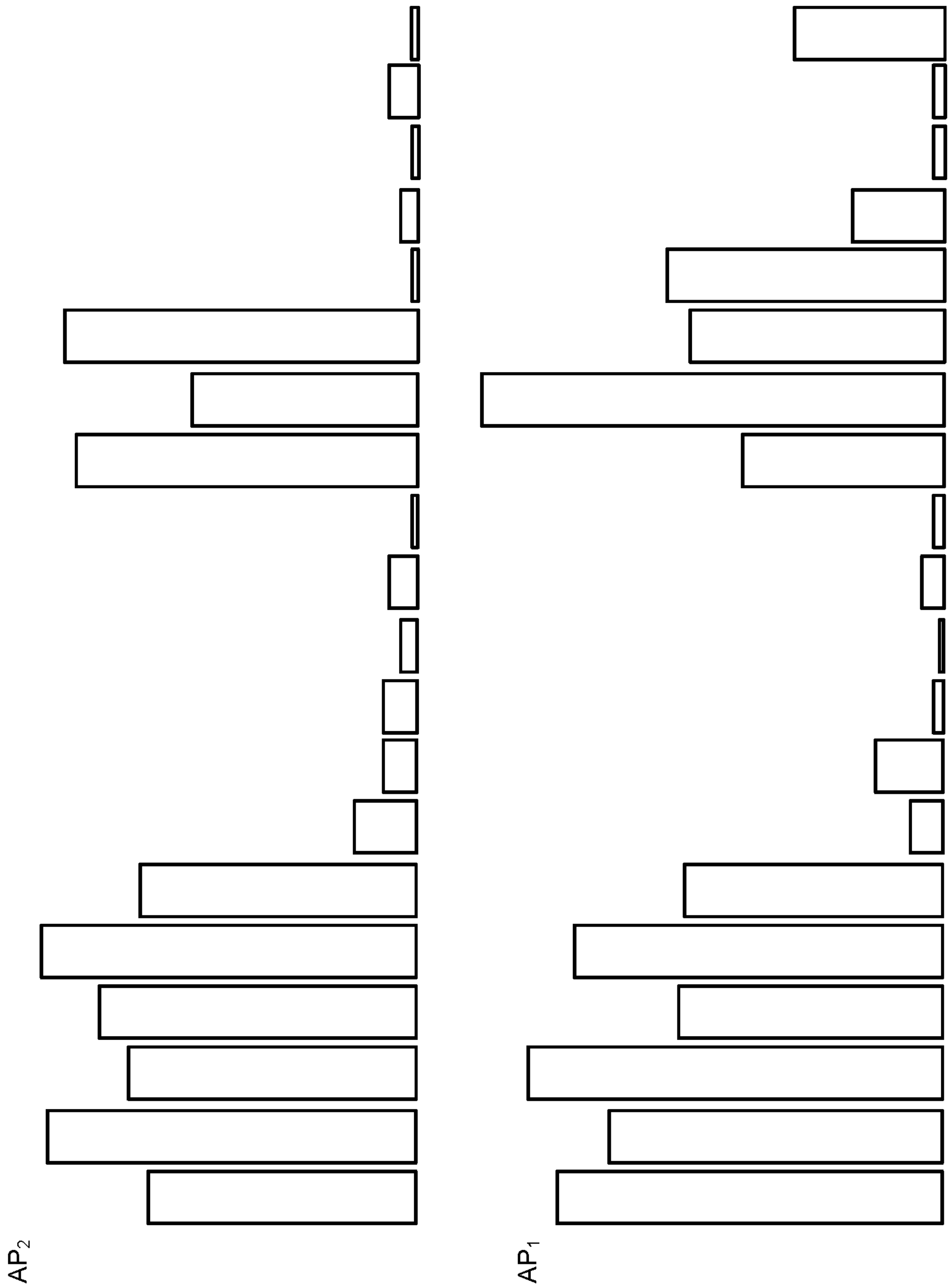
FIG. 10 is a drawing illustrating an example of a contention factor of access points in accordance with an embodiment of the present disclosure.
Figure 11:
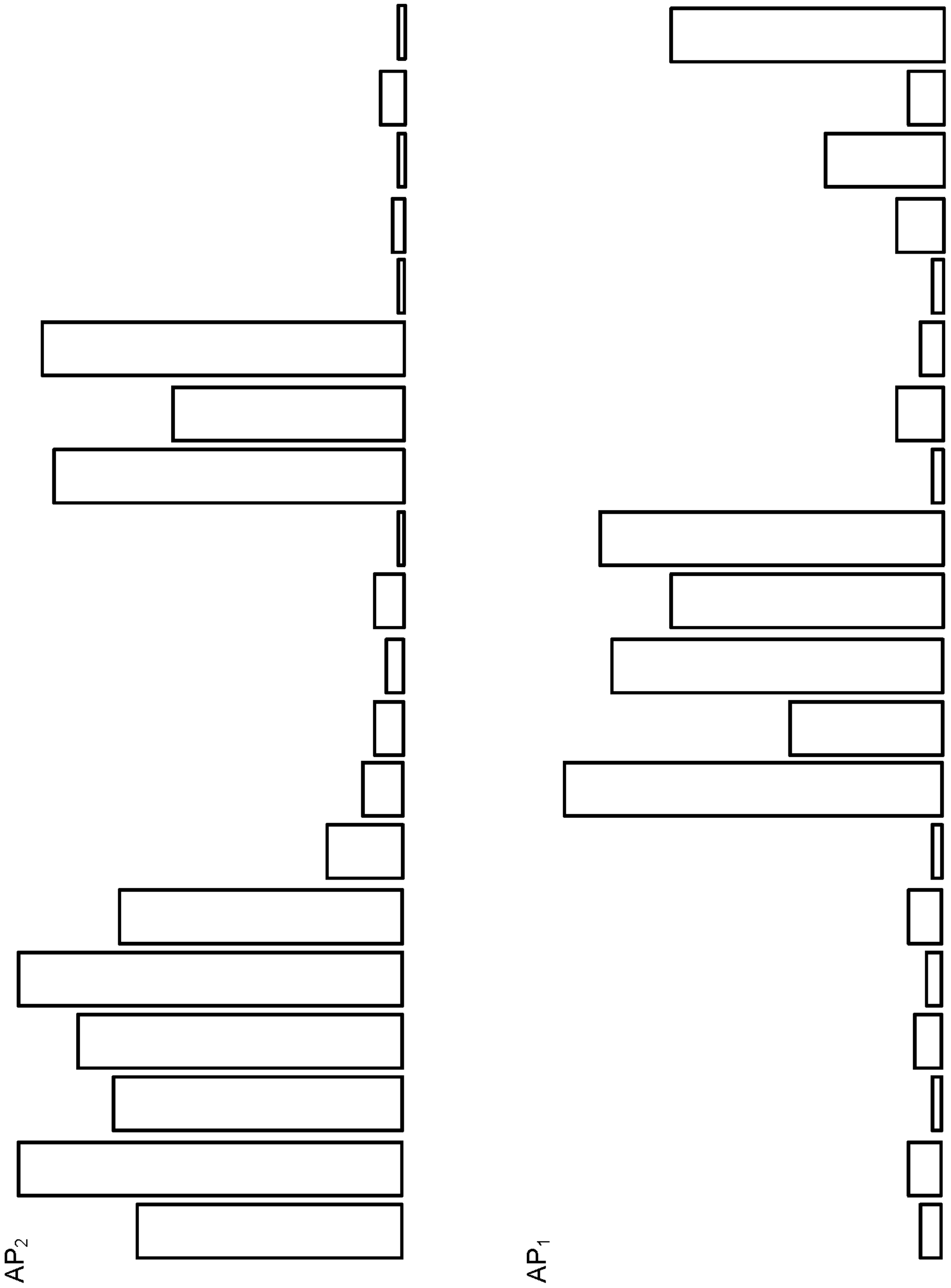
FIG. 11 is a drawing illustrating an example of a contention factor of access points in accordance with an embodiment of the present disclosure.

FIGS. 10 and 11 present drawings illustrating examples of contention factors of access points. Notably, FIGS. 10 and 11 shown historical airtime utilization of two neighboring access points, where each bin denotes a small time window (e.g., 30 s) and the height of a bin denotes the airtime utilization of the access point in the time window. FIG. 10 illustrates a high airtime contention factor, and FIG. 11 illustrates a low airtime contention factor.

During channel selection, a channel density (CD) may be computed. Channel density may be a metric that is used to evaluate the quality of the candidate channels for channel selection for an access point. Notably, the candidate channel with the smallest channel density may be selected for this access point. Note that the channel density for on channel may be defined as $$CD(RFNG, AP_i, c) = \sum_{A_j | (AP_i \to AP_j) \in RFNG} COW(AP_i(c) \to AP_j) \cdot SSW(AP_i \to AP_j) \cdot ITW(AP_i \to AP_j) \cdot ACF(AP_i \to AP_j) \cdot (1 - CCIAPW \cdot \mathrm{I\_cciaFlag}(AP_j)),$$

where $AP_i$ denotes neighboring access points (including peer and rogue access points), $COW(AP_i(c) \to AP_j)$ denotes the COW for edge $AP_i \to AP_j$ when $AP_i$ uses channel c, and $ACF(AP_i \to AP_j)$ denotes the ACF of edge $AP_i \to AP_j$ when $AP_i$ is a peer access point (and $ACF(AP_i \to AP_j)$ equals one when $AP_j$ is a rogue access point). Moreover, identity function I_cciaFlag($AP_j$) equals one when $AP_j$ is a peer access point and has 'cciaFlag=True,' otherwise I_cciaFlag ($AP_j$) equals zero when 'cciaFlag=False' or when $AP_j$ is a rogue access point. CCIA penalty weight (CCIAPW) denotes a weigh that a CCIA-protected access point applies to its own channel in order to discourage its neighboring access points from using the same channel. In some embodiments, the value of CCIAPW may take the average degree of nodes in the RFNG, e.g., 10.

Figure 12:
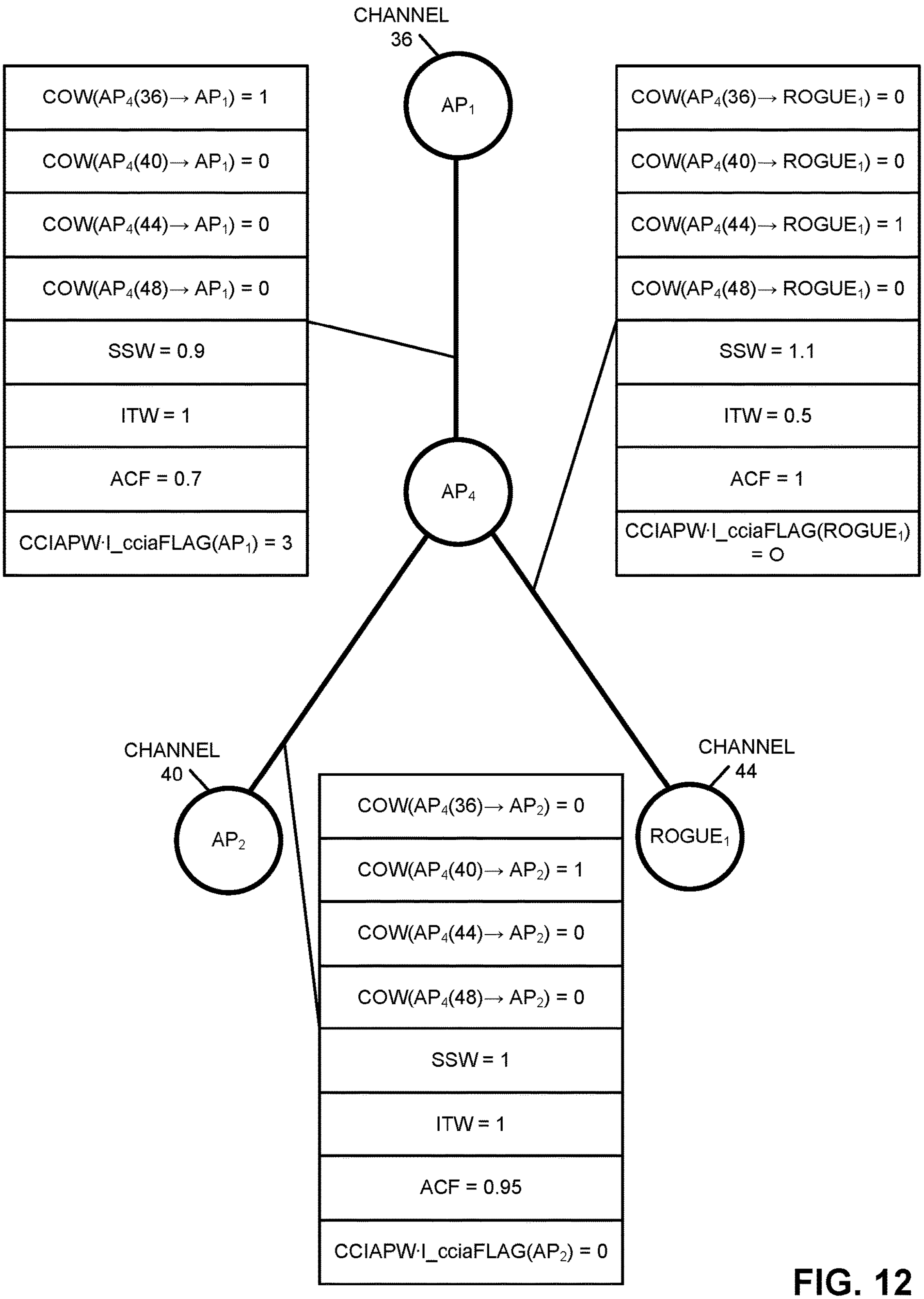
FIG. 12 is a drawing illustrating an example of selecting channels of access points in accordance with an embodiment of the present disclosure.

An example of a channel density calculation is shown in FIG. 12, which presents a drawing illustrating an example of selecting channels of access points in an RFNG. Notably, there may be four available channels, [36, 40, 44, 48]. $AP_1$ and $AP_2$ may be peer access points that use channels 36 and 40, respectively. $Rogue_1$ may be a rogue access point that uses channel 44. Note that $AP_1$ may be CCIA-protected with 'cciaFlag=True.' Moreover, the CCIAPW of this RFNG may be three.

The channel density of $AP_4$ for the four available channels may be calculated as $$\begin{aligned} CD(RFNG, AP_4, 36) &= 1 \cdot 0.9 \cdot 1 \cdot 0.7 \cdot (1+3) \\ &\quad + 0 \cdot 1 \cdot 1 \cdot 0.95 \cdot (1+0) \\ &\quad + 0 \cdot 1.1 \cdot 0.5 \cdot 1 \cdot (1+0) \\ &= 2.52 \\ CD(RFNG, AP_4, 40) &= 0 \cdot 0.9 \cdot 1 \cdot 0.7 \cdot (1+3) \\ &\quad + 1 \cdot 1 \cdot 1 \cdot 0.95 \cdot (1+0) \\ &\quad + 0 \cdot 1.1 \cdot 0.5 \cdot 1 \cdot (1+0) \\ &= 0.95 \\ CD(RFNG, AP_4, 44) &= 0 \cdot 0.9 \cdot 1 \cdot 0.7 \cdot (1+3) \\ &\quad + 0 \cdot 1 \cdot 1 \cdot 0.95 \cdot (1+0) \\ &\quad + 0 \cdot 1.1 \cdot 0.5 \cdot 1 \cdot (1+0) \\ &= 0 \end{aligned}$$

and $$\begin{aligned} CD(RFNG, AP_4, 48) &= 0 \cdot 0.9 \cdot 1 \cdot 0.7 \cdot (1+3) \\ &\quad + 0 \cdot 1 \cdot 1 \cdot 0.95 \cdot (1+0) \\ &\quad + 0 \cdot 1.1 \cdot 0.5 \cdot 1 \cdot (1+0) \\ &= 0. \end{aligned}$$

Obviously, channel 48, which has the smallest channel density, should be the selected channel for $AP_4$.

Moreover, the available channel list (ACL) may be obtained for each access point by jointly considering: a channel mask, a channel width (CW), and a DRCL for a RFNC. The channel mask is a vector that indicates which 20 MHz channels are enabled in the current band of frequencies for an access point. Furthermore, the channel mask may have a length equal to the number of 20 MHz channels on the current band of frequencies (e.g., 25 for the 5 GHz band of frequencies). The channel mask value for a channel may be denoted as CM(c). Note that channel c may be enabled when CM(c) equals one, and may be disabled when CM(c) equals zero.

Additionally, a channel having a channel width of 20 MHz may be available when it is enabled (CM(c) equal to one) and when it is not included in the DRCL (or c is not an element of the DRCL). Channel c with a higher channel width (e.g., 40 MHz, 80 MHz, etc.) may be available when: at least one 20 MHz channel that is included in c is enabled (or $\exists s \in c$, CM(s) equals one), and none of the 20 MHz channels that are included in c is included in the DRCL (or $\exists s \in c$, $s \in$ DRCL). Note that the ACL of a particular $AP_x$ with a channel width of w may be denoted as ACL($AP_x$, w).

An example of an ACL is shown in Table 3. Note that channel 62 (40 MHz), channel 58 (80 MHz) and channel 50 (160 MHz) may not be available because channel 60 is within the DRCL. On the other hand, channel 151 (40 MHz) and channel 155 (80 MHz) may be available even when CM(149) equals zero.

TABLE 3

| Channel (20 MHz) | Channel (40 MHz) | Channel (80 MHz) | Channel (160 MHz) | Channel Mask | DRCL | ACL (20 MHz) | Channel (40 MHz) | Channel (80 MHz) | Channel (160 MHz) |
|---|---|---|---|---|---|---|---|---|---|
| 36 | 38 | 42 | 50 | 1 | | 36 | 38 | 42 | |
| 40 | | | | 1 | | 40 | | | |
| 44 | 46 | | | 1 | | 44 | 46 | | |
| 48 | | | | 1 | | 48 | | | |
| 52 | 54 | 58 | | 1 | | 52 | 54 | | |
| 56 | | | | 1 | | 56 | | | |
| 60 | 62 | | | 1 | 60 | | | | |
| 64 | | | | 1 | | 64 | | | |
| 100 | 102 | 106 | 114 | 0 | | | | | |
| 104 | | | | 0 | | | | | |
| 108 | 110 | | | 0 | | | | | |
| 112 | | | | 0 | | | | | |
| 116 | 118 | 122 | | 0 | | | | | |
| 120 | | | | 0 | | | | | |
| 124 | 126 | | | 0 | | | | | |
| 128 | | | | 0 | | | | | |
| 132 | 134 | 138 | — | 0 | | | | | — |
| 136 | | | — | 0 | | | | | — |
| 140 | 142 | | — | 0 | | | | | — |
| 144 | | | — | 0 | | | | | — |
| 149 | 151 | 155 | — | 0 | | | | 155 | — |
| 153 | | | — | 1 | | 153 | | | — |
| 157 | 159 | | — | 1 | | 157 | | | — |
| 161 | | | — | 1 | | 161 | | | — |
| 165 | — | — | — | 1 | | 165 | | — | — |

During channel selection for a single access point with channel width w, the DCA may calculate the channel density for the channels in ACL($AP_i$, w) and may select the channel with the smallest CD value.

$$SC(AP_i, w) = \arg\min_{c \in ACL(AP_i, w)} CD(RFNC, AP_i, c),$$

where SC($AP_i$, w) denotes the selected channel for $AP_i$ with CW equal to w.

Then, the RFNG is updated. Notably, the DCA may update the RFNG and may write SC($AP_i$, w) as the new selected channel and the present time instant as a new channel update time to node $AP_i$ when three conditions are met: the new selected channel SC($AP_i$, w) may be different from the original channel before updating (or OC($AP_i$, w)); the time interval between the present time instant and the previous channel update for $AP_i$ may be larger than a predefined threshold $T_t$ (or $\Delta_t > T_t$); and the channel density improvement (ratio) by using SC($AP_i$, w) over using OC($AP_i$, w) may be larger than a predefined threshold $T_{CD}$ (or $\Delta_{CD} > T_{CD}$), where $$\Delta_{CD} = \frac{CD(RFNC, AP_i, OC(AP_i, w) - CD(RFNC, AP_i SC(AP_i, w))}{CD(RFNC, AP_i, OC(AP_i, w))}.$$

Note that these conditions may avoid frequent and excessive channel changes and may help ensure a stable channel plan for the RFNG. In some embodiments, $T_t$ may be 600s and $T_{CD}$ may be 0.2 (or 20%). Moreover, when the DCA is executed for an $AP_i$ for the first time, conditions $\Delta t > T_t$ and $\Delta_{CD} > T_{CD}$ may be set to true, and the RFNG may be updated with a selected channel.

Figure 13:
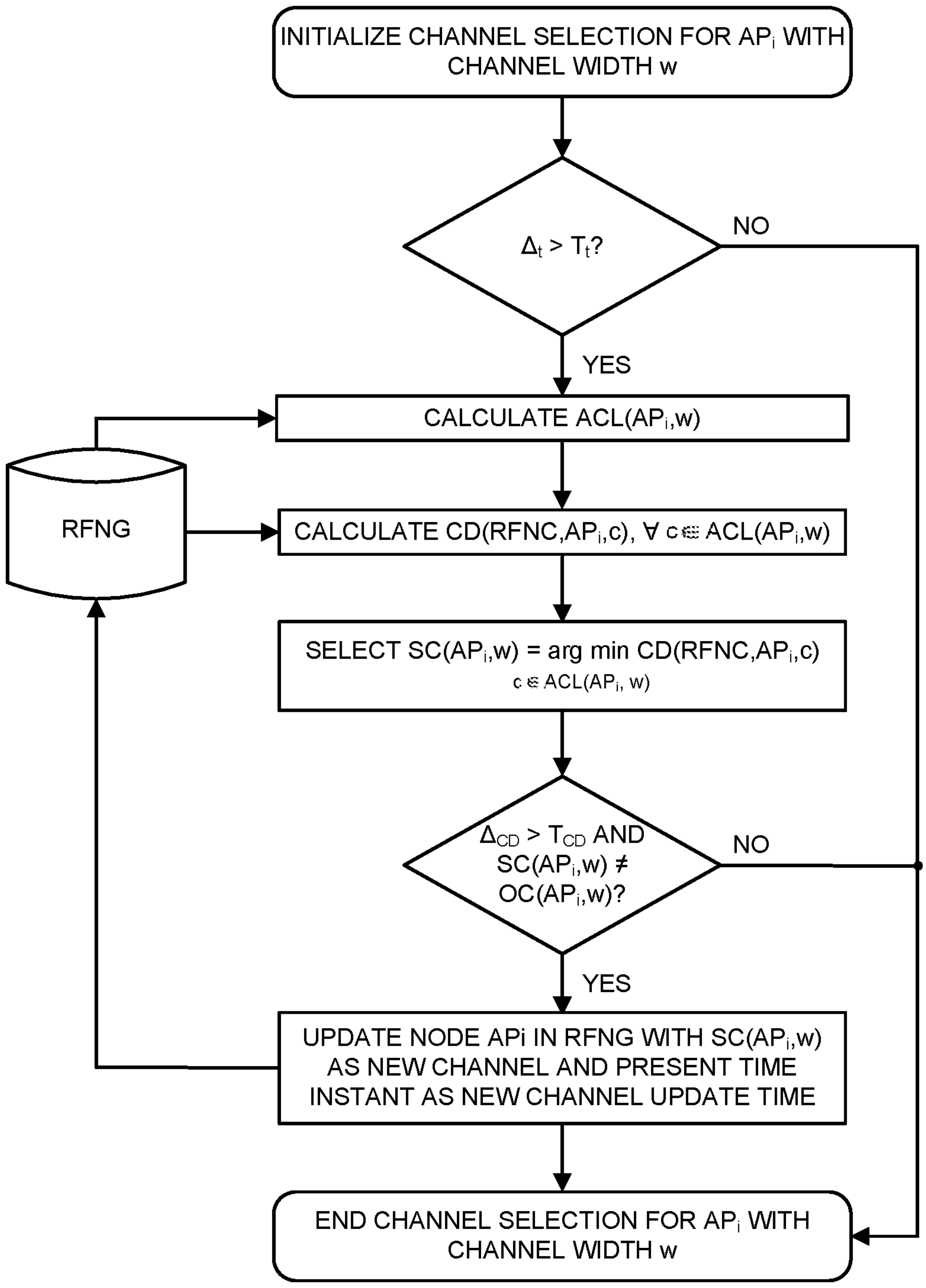
FIG. 13 is a flow diagram illustrating an example of a method for selecting a channel of an access point in accordance with an embodiment of the present disclosure.

FIG. 13 presents a flow diagram illustrating an example of a method for selecting a channel of an access point in FIG. 1. Notably, FIG. 13 illustrates channel selection for a single access point with channel width w.

Furthermore, channel selection for a RFNC with channel width w may be performed in an iterative manner. In a given iteration, channel selection with channel width w for the access points in this RFNC may be performed one-by-one in the descending order of their page-rank scores. The iteration may stop or terminate when the channel plan converges (e.g., no channel for an access point was updated in the previous iteration) or when the maximum number of iterations NI is reached. Note that the last-updated channel for each access-point node may be used as its final selected channel. In some embodiments, the channel plan converges quite fast (e.g., in 1-3 iterations), and an example value for NI may be ten.

Figure 14:
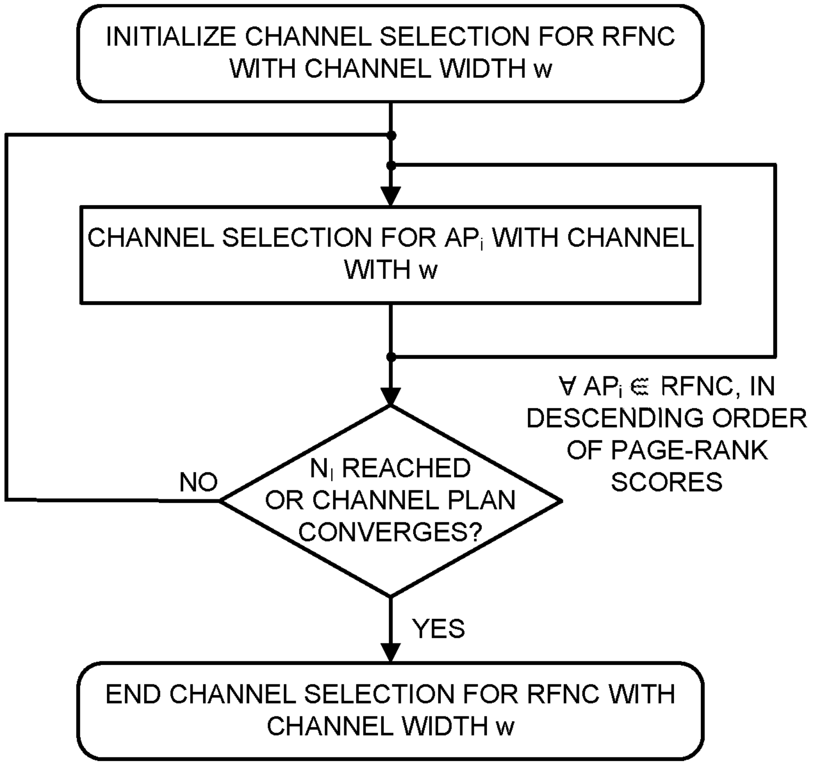
FIG. 14 is a flow diagram illustrating an example of a method for selecting channels of access points in accordance with an embodiment of the present disclosure.

FIG. 14 presents a flow diagram illustrating an example of a method for selecting channels of access points for an RFNC with channel width w. Note that the channel selection for different RFNCs in a RFNG may be performed in parallel without affecting each other.

We now describe the ACW technique. Within the same RFNG, an access-point density (the average number of peer access points one access point can detect) is typically uneven across different RFNCs. Consequently, it is usually suboptimal to force all the RFNCs to use the same channel width for channel selection. For example, while using a small channel width allows more available channels and, thus, reduces CCIR in general, it may not be able to fully utilize the RF channels in a sparse RFNC with low access-point density (which may the reduce efficiency of RF utilization). On the other hand, while using a large channel width reduces the chances of leaving some RF channels unused, it also reduces the number of available channels, which may result in high CCIR in a dense RFNC with high access-point density. Therefore, optimal channel width may be determined individually for each RFNC in a RFNG. ACW may be designed for this purpose.

In ACW, a list of supported channel widths on the current band of frequencies may be denoted as CWL. For example, CWL may equal [80 MHZ, 40 MHZ, 20 MHz] for a 5 GHz band of frequencies and CWL may equal [160 MHz, 80 MHZ, 40 MHZ, 20 MHz] for a 6 GHz band of frequencies.

The optimal channel width for each RFNC may be defined as the largest channel width that can achieve a CCIR that is less than or equal to a given threshold (or CCI criterion). Note that ACW may find $w_o$ for a particular RFNC, such as $RFNC_k$ (e.g., in an iterative manner). At the start of ACW, the current channel width of $RENC_k$ may be initialized with the largest channel width in CWL, e.g., we equal to the maximum(CWL). In each iteration, the DCA may be performed for $RFNC_k$ with $w_c$, and CCIR with the resulting channel plan (or CCIR($RFNC_k$)) may be calculated. The iteration may stop when CCIR($RFNC_k$) is less than or equal to $T_{CCIR}$ is met or achieved, and the current channel width may be used as the optimal channel width (or $w_o$ equals $w_c$). Otherwise, the channel width of $RENC_k$ may be set as the next largest channel width (or $w_c$ equals maximum(CWL−{$w_c$}), and the next iteration may start. When CCIR($RFNC_k$) less than or equal to $T_{CCIR}$ cannot be met or achieved even with the smallest channel width (e.g., 20 MHz), $w_o$ may be set as 20 MHz. The channel plan with $w_o$ may then be obtained for $RFNC_k$.

Figure 15:
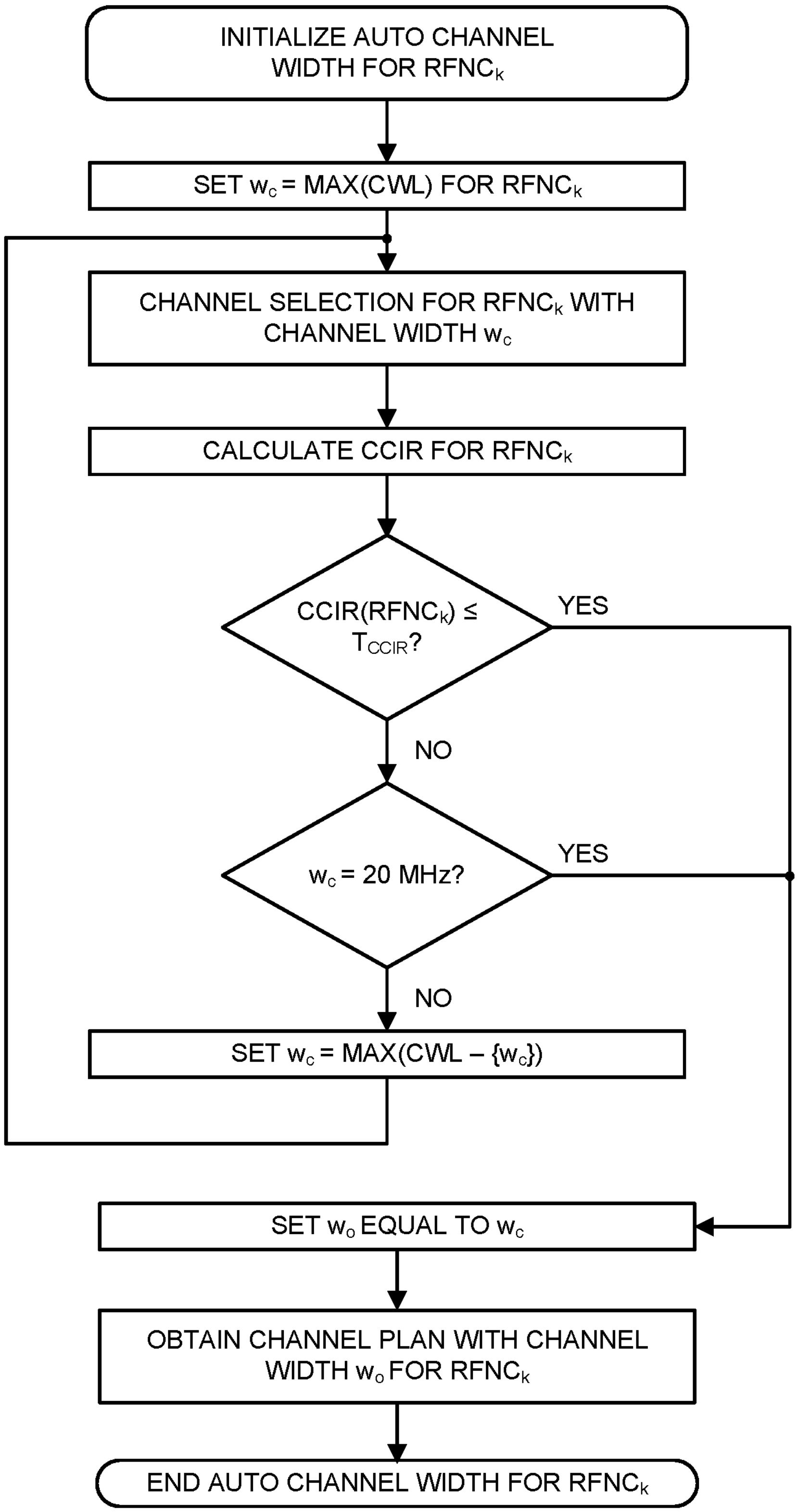
FIG. 15 is a flow diagram illustrating an example of a method for selecting channel widths of access points in accordance with an embodiment of the present disclosure.

FIG. 15 presents a flow diagram illustrating an example of a method for selecting channel widths of access points using ACW. Note that the ACW for different RFNCs in a RFNG may be performed in parallel without affecting each other.

We now describe the AHCW technique. When CCIR ($RFNC_k$) equal to zero is met or achieved for $RFNC_k$ with optimal channel width $w_o$ obtained by ACW, it may be possible to further improve the efficiency of RF utilization by adopting a larger channel width $w_h$ for a subset of access points in $RFNC_k$ while maintaining CCIR($RFNC_k$) equal to zero. AHCW may be designed for this purpose.

AHCW may first check if $w_o$ is equal to the largest channel width in CWL. If yes, there is no larger channel width that can be used, and AHCW is not needed. However, when $w_o$ is less than the maximum(CWL), the DCA may be performed for $RFNC_k$ with $w_h$, where $w_h$ is two times $w_o$ (or $w_h$ equals $2w_o$). Obviously, zero CCIR cannot be achieved with $w_h$, and co-channel edges exist in $RFNC_k$, which may be denoted as $AP_{x1} \rightarrow AP_{x2}$, where x equals 1, 2, . . . X. AHCW may further check whether any unsolvable co-channel rings (UCCR) exists in $RFNC_k$. Note that a UCCR may be a polygon with an odd number of sides (e.g., a triangle, a pentagon, a heptagon, etc.) in which all of its sides are members of the co-channel edges. When a UCCR exists, a hybrid channel plan cannot be achieved by AHCW. Otherwise, for co-channel edge $AP_{x1} \rightarrow AP_{x2}$, the common channel (with a channel width of $w_h$) of $AP_{x1}$ and $AP_{x2}$ may be split into two sub-channels (each with a channel width of $w_o$) that may be assigned to $AP_{x1}$ and $AP_{x2}$, respectively. Because these two sub-channels have no overlap, the CCI on $AP_{x1} \rightarrow AP_{x2}$ may be removed. This CCI removal process may repeat for the X co-channel edges $AP_{x1} \rightarrow AP_{x2}$, where x equals 1, 2, . . . X. With AHCW, a channel plan with hybrid channel width (e.g., $w_h$, $w_o$) may be obtained. Notably, the access points that are not involved to the co-channel edges may be able to use a larger channel width $w_h$ while CCIR($RFNC_k$) equal to zero is maintained. As a comparison, a result of ACW would require the access points in $RFNC_k$ to use the common channel width $w_o$ to achieve CCIR($RFNC_k$) equal to zero.

We now provide several examples of co-channel edges with/without UCCR to illustrate why CCI cannot be removed by AHCW with UCCR. In these examples, $w_o$ equals 20 MHz and $w_h$ equals 40 MHz. Channel 38 (with a channel width of 40 MHZ) and two sub-channels of channel 38, notably, channels 36 and 40 (with channel widths of 20 MHz), are indicated in FIGS. 16A-18B. Moreover, the co-channel edges are indicated using dashed lines.

Figure 16A:
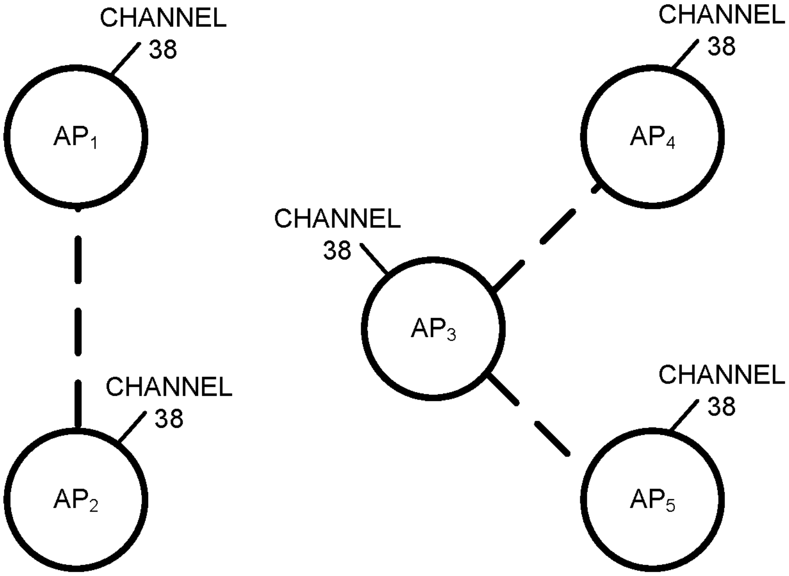
FIG. 16A is a drawing illustrating an example of access points having a common channel width in accordance with an embodiment of the present disclosure.
Figure 16B:
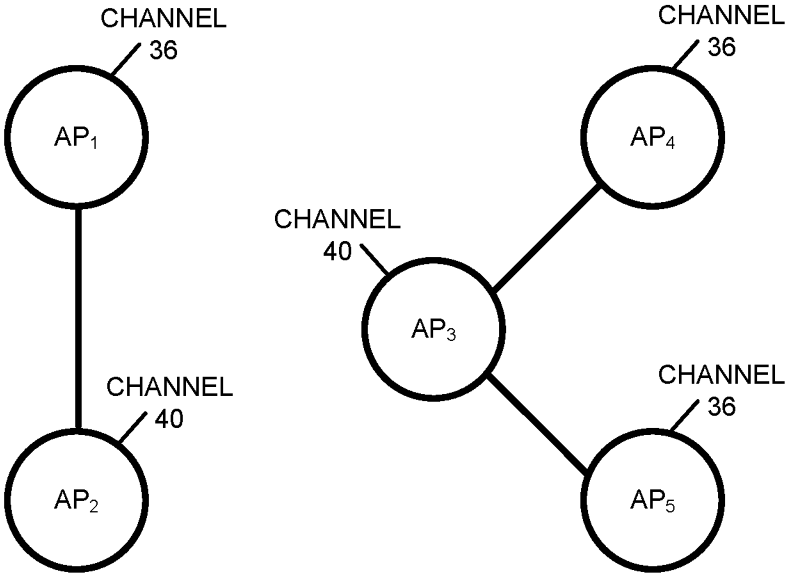
FIG. 16B is a drawing illustrating an example of access points having different channel widths in accordance with an embodiment of the present disclosure.

In a first scenario, there is no UCCR and CCI may be removed by AHCW. Notably, before AHCW is shown in FIG. 16A, which presents a drawing illustrating an example of access points having a common channel width. Moreover, after AHCW is shown in FIG. 16B, which presents a drawing illustrating an example of access points having different channel widths.

Figure 17A:
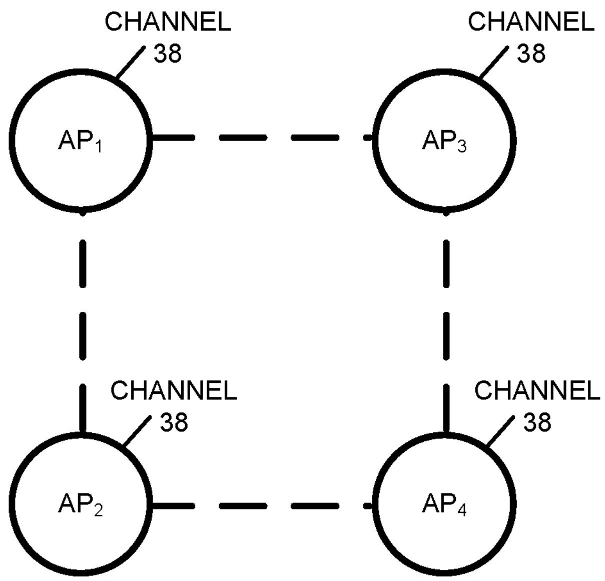
FIG. 17A is a drawing illustrating an example of access points having a common channel width in accordance with an embodiment of the present disclosure.
Figure 17B:
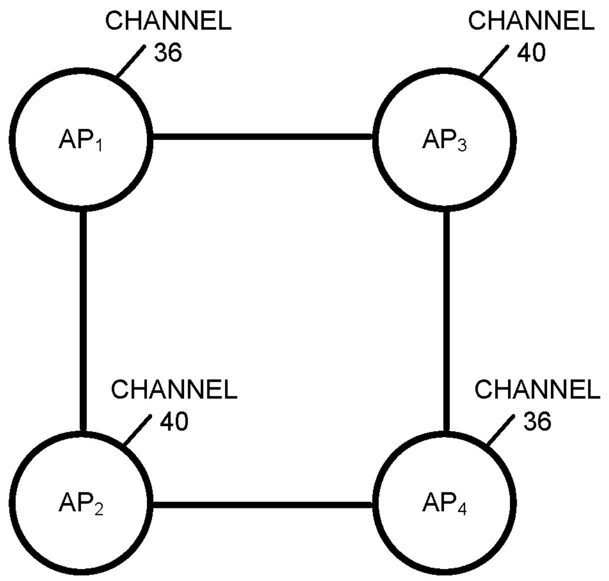
FIG. 17B is a drawing illustrating an example of access points having different channel widths in accordance with an embodiment of the present disclosure.

Moreover, in a second scenario, there is no UCCR and CCI may be removed by AHCW. Notably, before AHCW is shown in FIG. 17A, which presents a drawing illustrating an example of access points having a common channel width. Moreover, after AHCW is shown in FIG. 17B, which presents a drawing illustrating an example of access points having different channel widths.

Figure 18A:
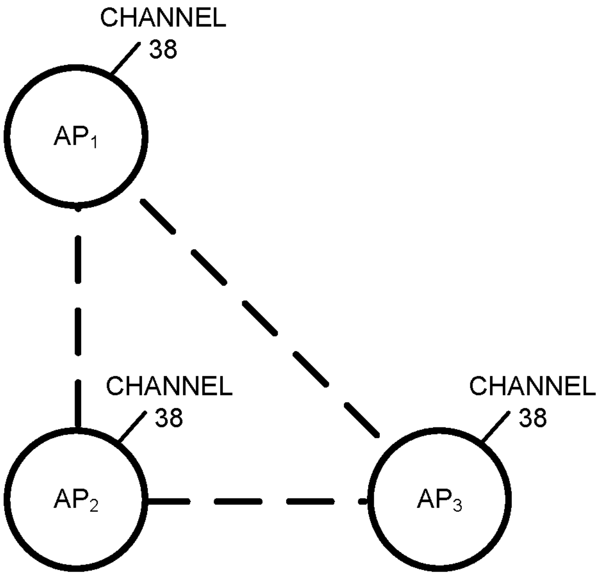
FIG. 18A is a drawing illustrating an example of access points having a common channel width in accordance with an embodiment of the present disclosure.
Figure 18B:
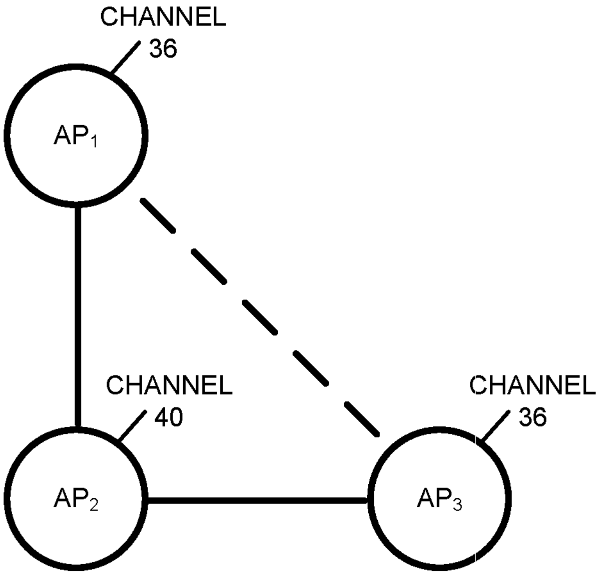
FIG. 18B is a drawing illustrating an example of access points having different channel widths in accordance with an embodiment of the present disclosure.

Furthermore, in a third scenario, there is UCCR and CCI cannot be removed by AHCW. Notably, before AHCW is shown in FIG. 18A, which presents a drawing illustrating an example of access points having a common channel width. Moreover, after AHCW is shown in FIG. 18B, which presents a drawing illustrating an example of access points having different channel widths.

Figure 19:
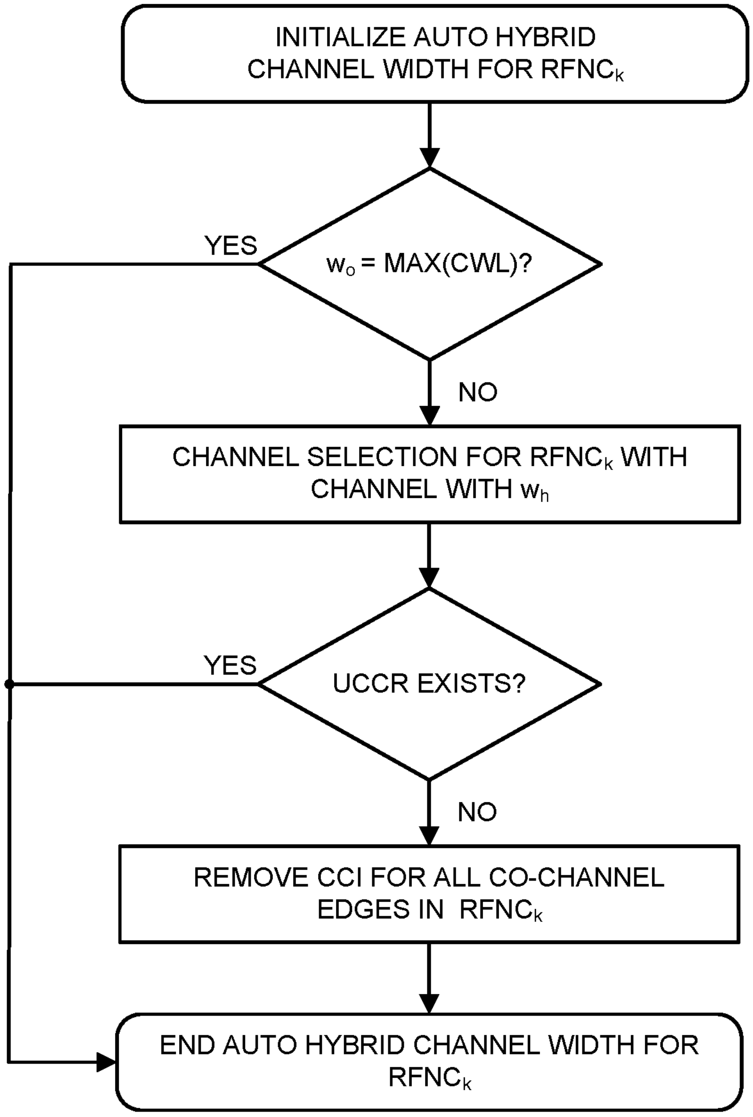
FIG. 19 is a flow diagram illustrating an example of a method for selecting channel widths of access points in accordance with an embodiment of the present disclosure.

FIG. 19 presents a flow diagram illustrating an example of a method for selecting channel widths of access points using AHCW. Note that AHCW for different RFNCs in a RFNG may be performed in parallel without affecting each other.

In some embodiments, the communication techniques include selective automatic transmit power adjustment (ATPA). Notably, when CCIR($RFNC_k$) equal to zero cannot be achieved for $RFNC_k$ with AHCW (e.g., because of the existence of UCCR), it may be possible to further reduce the CCI by reducing the transmit power of the interfering access points of the residual co-channel edges. APTA is designed for this purpose.

During these embodiments, an interfering access point may refer to an access point that has at least one co-channel edge pointing to it neighboring access points. Note that the minimum co-channel edge SNR threshold may be denoted as $SNR_m$. When the SNR of a certain co-channel edge is no greater than $SNR_m$, the interference on this co-channel edge may be considered as weak and negligible. Therefore, the objective may be to reduce the transmit power of the interfering access points such that the SNR of the co-channel edges is no greater than $SNR_m$.

Before reducing the transmit power of an access point, the computer system may need to make sure that this operation will not create any 'coverage holes' between this access point and its neighboring access point(s). To this end, for each interfering access point, the computer system may calculate the power adjustment headroom (PAH), which indicates the maximum possible transmit power reduction on this access point without creating any coverage holes. Specifically, when an access point has at least three neighboring access points, and the edge from this access point to its third strongest neighboring access point has an SNR of $SNR_{3rd}$, the PAH for this access point may be calculated as $$PAH(AP) = \min(\max(SNR_{3rd} - SNR_n, 0), PAH_{max}),$$

where the given threshold $SNR_n$ (e.g., 20 dB) denotes the SNR threshold for a neighboring access point to be considered a 'strong neighbor,' and $PAH_{max}$ denotes the global maximum allowed transmit power reduction. Alternatively, when an access point has less than three neighboring access points, no transmit power reduction may be carried out on this access point and PAH(AP) may equal zero.

Suppose there are Y interfering access points in $RFNC_k$, e.g., $AP_y$, where y equals 1, 2, . . . Y. The co-channel edges of $AP_y$ may be denoted as $AP_y \rightarrow AP_z$, where z equals 1, 2, . . . $Z_y$, and where $Z_y$ denotes the number of cochannel neighboring access points of $AP_y$. The SNR of edge of edge $AP_y \rightarrow AP_z$ may be denoted as $SNR(AP_y \rightarrow AP_z)$. The transmit power reduction for $AP_y$, where y equals 1, 2, . . . Y, may be calculated as $$PR(AP_y) = \min\left(PAH(AP_y), \max_{z \in 1, 2, \ldots, Z_y} (SNR(AP_y \rightarrow AP_z)) - SNR_m\right).$$

The transmit power of $AP_y$, where y equals 1, 2, . . . Y, may be reduced by $PR(AP_y)$.

If $$\text{If } PAH(AP_y) \geq \max_{z \in 1, 2, \ldots Z_y} (SNR(AP_y \rightarrow AP_z)) - SNR_m\Big),$$

then $$\text{SNR\_PR}(AP_y \rightarrow AP_z) = SNR(AP_y \rightarrow AP_z) - PR(AP_y) \leq SNR_m,\ z \in 1, 2, \ldots Z_y,$$

where $SNR\_PR(AP_y \rightarrow AP_z)$ denotes the SNR of edge $AP_y \rightarrow AP_z$ after transmit power reduction at $AP_y$. Stated differently, with transmit-power reduction $PR(AP_y)$ each of the co-channel edges of $AP_y$ may now have an SNR that is no greater than $SNR_m$ and, therefore, may become negligible. Alternatively, if $$PAH\,(AP_y) > \max_{z \in 1, 2, \ldots Z_y} (SNR\,(AP_y \rightarrow AP_z)) - SNR_m),$$

the SNR of some co-channel edges from $AP_y$ will still be greater than $SNR_m$ and, therefore, the co-channel interference from $AP_y$ cannot be completely removed.

Note that even in the case where the co-channel interference cannot be completely removed, the CCIR may still be improved by APTA, because some of the co-channel edges may become weaker and even negligible.

Figure 20:
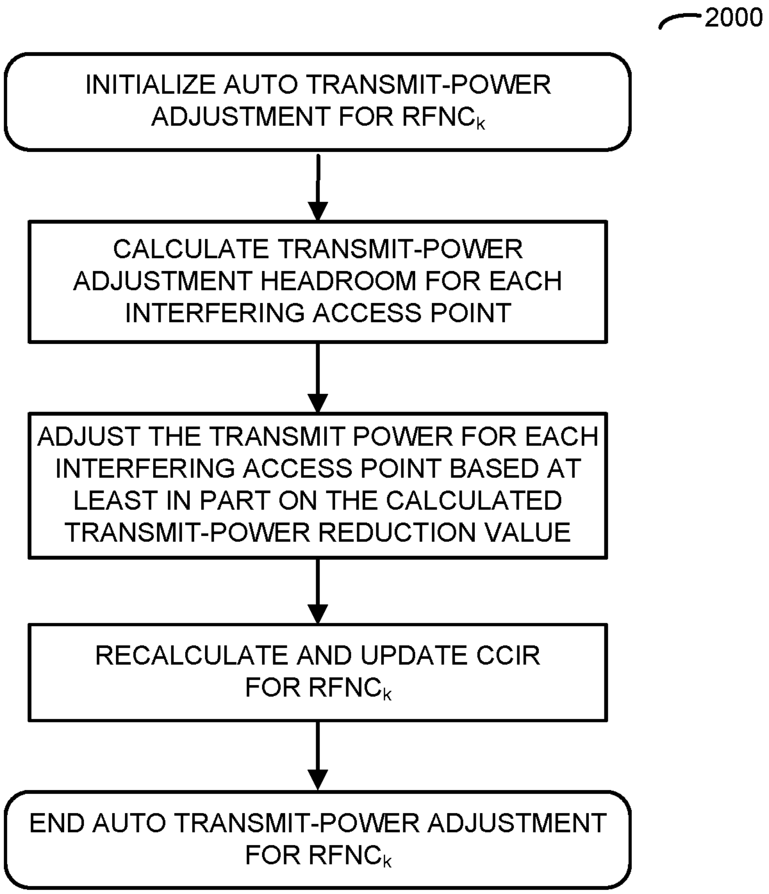
FIG. 20 is a flow diagram illustrating an example of a method for automatically adjusting transmit power of one or more access points in accordance with an embodiment of the present disclosure.

FIG. 20 presents a flow diagram illustrating an example of a method 2000 for automatically adjusting transmit power of one or more access points.

We now describe embodiments of an electronic device, which may perform at least some of the operations in the communication techniques. FIG. 21 presents a block diagram illustrating an example of an electronic device 2100 in accordance with some embodiments, such as one of: base station 108, one of electronic devices 110, controller 112, one of access points 116, one of radio nodes 1120, computer network device 1220, or computer system 130. This electronic device includes processing subsystem 2110, memory subsystem 2112, and networking subsystem 2114. Processing subsystem 2110 includes one or more devices configured to perform computational operations. For example, processing subsystem 2110 can include one or more microprocessors, graphics processing units (GPUs), ASICs, microcontrollers, programmable-logic devices, and/or one or more digital signal processors (DSPs).

Memory subsystem 2112 includes one or more devices for storing data and/or instructions for processing subsystem 2110 and networking subsystem 2114. For example, memory subsystem 2112 can include DRAM, static random access memory (SRAM), and/or other types of memory. In some embodiments, instructions for processing subsystem 2110 in memory subsystem 2112 include: one or more program modules or sets of instructions (such as program instructions 2122 or operating system 2124, such as Linux, UNIX, Windows Server, or another customized and proprietary operating system), which may be executed by processing subsystem 2110. Note that the one or more computer programs, program modules or instructions may constitute a computer-program mechanism. Moreover, instructions in the various modules in memory subsystem 2112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2110.

In addition, memory subsystem 2112 can include mechanisms for controlling access to the memory. In some embodiments, memory subsystem 2112 includes a memory hierarchy that comprises one or more caches coupled to a memory in electronic device 2100. In some of these embodiments, one or more of the caches is located in processing subsystem 2110.

In some embodiments, memory subsystem 2112 is coupled to one or more high-capacity mass-storage devices (not shown). For example, memory subsystem 2112 can be coupled to a magnetic or optical drive, a solid-state drive, or another type of mass-storage device. In these embodiments, memory subsystem 2112 can be used by electronic device 2100 as fast-access storage for often-used data, while the mass-storage device is used to store less frequently used data.

Networking subsystem 2114 includes one or more devices configured to couple to and communicate on a wired and/or wireless network (i.e., to perform network operations), including: control logic 2116, an interface circuit 2118 and one or more antennas 2120 (or antenna elements). (While FIG. 21 includes one or more antennas 2120, in some embodiments electronic device 2100 includes one or more nodes, such as antenna nodes 2108, e.g., a metal pad or a connector, which can be coupled to the one or more antennas 2120, or nodes 2106, which can be coupled to a wired or optical connection or link. Thus, electronic device 2100 may or may not include the one or more antennas 2120. Note that the one or more nodes 2106 and/or antenna nodes 2108 may constitute input(s) to and/or output(s) from electronic device 2100.) For example, networking subsystem 2114 can include a Bluetooth networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 2100 may be adapted or changed using pattern shapers (such as directors or reflectors) and/or one or more antennas 2120 (or antenna elements), which can be independently and selectively electrically coupled to ground to steer the transmit antenna pattern in different directions. Thus, if one or more antennas 2120 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 2100 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 2114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 2100 may use the mechanisms in networking subsystem 2114 for performing simple wireless communication between the electronic devices, e.g., transmitting advertising or beacon frames and/or scanning for advertising frames transmitted by other electronic devices as described previously.

Within electronic device 2100, processing subsystem 2110, memory subsystem 2112, and networking subsystem 2114 are coupled together using bus 2128. Bus 2128 may include an electrical, optical, and/or electro-optical connection that the subsystems can use to communicate commands and data among one another. Although only one bus 2128 is shown for clarity, different embodiments can include a different number or configuration of electrical, optical, and/or electro-optical connections among the subsystems.

In some embodiments, electronic device 2100 includes a display subsystem 2126 for displaying information on a display, which may include a display driver and the display, such as a liquid-crystal display, a multi-touch touchscreen, etc.

Moreover, electronic device 2100 may include a user-interface subsystem 2130, such as: a mouse, a keyboard, a trackpad, a stylus, a voice-recognition interface, and/or another human-machine interface. In some embodiments, user-interface subsystem 2130 may include or may interact with a touch-sensitive display in display subsystem 2126.

Electronic device 2100 can be (or can be included in) any electronic device with at least one network interface. For example, electronic device 2100 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 2100, in alternative embodiments, different components and/or subsystems may be present in electronic device 2100. For example, electronic device 2100 may include one or more additional processing subsystems, memory subsystems, networking subsystems, and/or display subsystems. Additionally, one or more of the subsystems may not be present in electronic device 2100. Moreover, in some embodiments, electronic device 2100 may include one or more additional subsystems that are not shown in FIG. 21. Also, although separate subsystems are shown in FIG. 21, in some embodiments some or all of a given subsystem or component can be integrated into one or more of the other subsystems or component(s) in electronic device 2100. For example, in some embodiments instructions 2122 is included in operating system 2124 and/or control logic 2116 is included in interface circuit 2118.

Moreover, the circuits and components in electronic device 2100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 2114 and/or of electronic device 2100. The integrated circuit may include hardware and/or software mechanisms that are used for transmitting wireless signals from electronic device 2100 and receiving signals at electronic device 2100 from other electronic devices. Aside from the mechanisms herein described, radios are generally known in the art and hence are not described in detail. In general, networking subsystem 2114 and/or the integrated circuit can include any number of radios. Note that the radios in multiple-radio embodiments function in a similar way to the described single-radio embodiments.

In some embodiments, networking subsystem 2114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape, an optical, a magnetic disk or a solid-state disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 2122, operating system 2124 (such as a driver for interface circuit 2118) or in firmware in interface circuit 2118. Alternatively, or additionally, at least some of the operations in the communication techniques may be implemented in a physical layer, such as hardware in interface circuit 2118.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:

an interface circuit configured to communicates with access points, wherein the computer system is configured to:

receive, associated with the access points, information about the access points and specifying one or more communication-performance metrics associated with the shared band of frequencies;

compute, for the access points, co-channel interference (CCI) metrics based at least in part on the information about the access points and the one or more communication-performance metrics, wherein a CCI metric in the CCI metrics for a given access point in the access points is based at least in part on pairs of access points in the access points;

select channels and channel widths of the access points based at least in part on the CCI metrics, a graph representation of the access points and a CCI criterion, wherein nodes in the graph representation correspond to the access points and edges in the graph representation correspond to communication between the pairs of access points; and provide, addressed to the access points, second information specifying the channels and the channel widths of the access points, wherein the interface circuit is further configured to:

select the channel widths using a common channel width for the access points such that the CCI criterion is satisfied; and select revised channel widths for a subset of the access points based at least in part on the CCI metrics, the graph representation of the access points, and the CCI criterion, the revised channel widths being greater than the common channel width.

2. The computer system of claim 1, wherein the CCI metric is based at least in part on current channel overlap of a given pair of access points in the pairs of access points.

3. The computer system of claim 1, wherein the CCI metric is based at least in part on signal strength metric of the given pair of access points in the pairs of access points; and wherein the signal strength metric may correspond to an average signal-to-noise ratio (SNR) of the given pair of access points over a time interval.

4. The computer system of claim 1, wherein the CCI metric is based at least in part on signal strength metric of the given pair of access points in the pairs of access points; and wherein the CCI metric is based at least in part on an interference type metric corresponding to whether the given access point is a peer in the access points or is a rogue access point in the access points.

5. The computer system of claim 1, wherein the graph representation of the access points corresponds to a network topology of the access points.

6. The computer system of claim 1, wherein the channels and the channel widths of the access points are iteratively selected; and wherein the iterative selection comprises repeating the computing and the selecting operations multiple times until the CCI criterion is achieved.

7. The computer system of claim 1, wherein the channels and the channel widths of the access points are selected based at least on a ranking of the access points corresponding to numbers of edges associated with the nodes in the graph representation, a centrality of the nodes in the graph representation, or both.

8. The computer system of claim 7, wherein an access point corresponding to a node having a maximum number of edges, a number of edges exceeding a predefined value, a maximum centrality or a centrality greater than a second predefined value has a higher ranking than remaining access points in the access points.

9. The computer system of claim 1, wherein the channel widths comprise a common channel width of the access points; and wherein the computer system is configured to select the common channel width by reducing the common channel width until the CCI criterion is achieved.

10. The computer system of claim 1, wherein the information about the access points and specifying one or more communication-performance metrics received from the given access point comprises: one or more detected access points, signal-to-noise ratios (SNRs) of the one or more detected access points, whether the one or more detected access points are peer or rouge access points, airtime utilization, whether the given access point is a mesh access point or a root access point in a mesh network, or occurrence of a dynamic frequency selection (DFS) signal.

11. The computer system of claim 1, wherein the selecting is performed using a pretrained neural network.

12. The computer system of claim 1, wherein the selecting is based at least in part on one or more of: historical communication performance data, historical dynamic frequency selection (DFS) data or priorities of the access points.

13. The computer system of claim 1, wherein, when a probability of a dynamic frequency selection (DFS) signal occurring for a channel in the channels is greater than a predefined value, the selecting avoids using the channel.

14. The computer system of claim 1, wherein a single node in the graph representation corresponds to mesh access points in a mesh network.

15. The computer system of claim 1, wherein one or more of the access points are outside of radio-frequency communication range of at least some of a remainder the access points.

16. The computer system of claim 1, wherein the computer system comprises: a controller of the access points, which is configured to manage and configure operation of the access points; or a cloud-based computer system.

17. The computer system of claim 1, wherein, when CCI exceeds a threshold value after selecting the channel and/or the channel widths, the computer system is configured to provide, addressed to one or more of the access points, instructions to adjust transmit power of the one or more of the access points.

18. A non-transitory computer-readable storage medium for use in conjunction with a computer system, the computer-readable storage medium storing program instructions that, when executed by the computer system, cause the computer system to perform operations comprising:

receiving, associated with access points, information about the access points and specifying one or more communication-performance metrics associated with the shared band of frequencies;

computing, for the access points, co-channel interference (CCI) metrics based at least in part on the information about the access points and the one or more communication-performance metrics, wherein a CCI metric in the CCI metrics for a given access point in the access points is based at least in part on pairs of access points in the access points;

selecting channels and channel widths of the access points based at least in part on the CCI metrics, a graph representation of the access points and a CCI criterion, wherein nodes in the graph representation correspond to the access points and edges in the graph representation correspond to communication between the pairs of access points; and providing, addressed to the access points, second information specifying the channels and the channel widths of the access points, wherein selecting the channels and the channel widths further comprises:

selecting the channel widths using a common channel width for the access points such that the CCI criterion is satisfied; and selecting revised channel widths for a subset of the access points based at least in part on the CCI metrics, the graph representation of the access points, and the CCI criterion, the revised channel widths being greater than the common channel width.

19. A method for selecting channels and channel widths, comprising:

by a computer system:

receiving, associated with access points, information about the access points and specifying one or more communication-performance metrics associated with the shared band of frequencies;

computing, for the access points, co-channel interference (CCI) metrics based at least in part on the information about the access points and the one or more communication-performance metrics, wherein a CCI metric in the CCI metrics for a given access point in the access points is based at least in part on pairs of access points in the access points;

selecting the channels and the channel widths of the access points based at least in part on the CCI metrics, a graph representation of the access points and a CCI criterion, wherein nodes in the graph representation correspond to the access points and edges in the graph representation correspond to communication between the pairs of access points; and providing, addressed to the access points, second information specifying the channels and the channel widths of the access points, wherein selecting the channels and the channel widths further comprises:

selecting the channel widths using a common channel width for the access points such that the CCI criterion is satisfied; and selecting revised channel widths for a subset of the access points based at least in part on the CCI metrics, the graph representation of the access points, and the CCI criterion, the revised channel widths being greater than the common channel width.

* * * * *